US009897188B2

(12) United States Patent
Yanase et al.

(10) Patent No.: US 9,897,188 B2
(45) Date of Patent: Feb. 20, 2018

(54) DIFFERENTIAL DEVICE

(71) Applicant: MUSASHI SEIMITSU INDUSTRY CO., LTD., Toyohashi-shi, Aichi (JP)

(72) Inventors: Yoichi Yanase, Toyohashi (JP); Hiroyuki Mori, Toyohashi (JP)

(73) Assignee: Musashi Seimitsu Industry Co., Ltd., Aichi (JP)

( * ) Notice: Subject to any disclaimer, the term of this patent is extended or adjusted under 35 U.S.C. 154(b) by 253 days.

(21) Appl. No.: 14/955,319

(22) Filed: Dec. 1, 2015

(65) Prior Publication Data
US 2016/0160983 A1    Jun. 9, 2016

(30) Foreign Application Priority Data

Dec. 3, 2014  (JP) .................. 2014-245019
Oct. 7, 2015  (JP) .................. 2015-199797
Nov. 6, 2015  (JP) .................. 2015-218907

(51) Int. Cl.
*F16H 48/40* (2012.01)
*F16H 48/08* (2006.01)
*F16H 48/38* (2012.01)

(52) U.S. Cl.
CPC ............. *F16H 48/40* (2013.01); *F16H 48/08* (2013.01); *F16H 2048/382* (2013.01)

(58) Field of Classification Search
CPC ............................................ F16H 48/40
See application file for complete search history.

(56) References Cited

U.S. PATENT DOCUMENTS

| 1,128,429 A | 2/1915 | Fetzer |
| 5,938,558 A | 8/1999 | Eybergen et al. |

(Continued)

FOREIGN PATENT DOCUMENTS

| CN | 1212215 A | 3/1999 |
| CN | 102470486 A | 5/2012 |

(Continued)

OTHER PUBLICATIONS

Office Action dated Oct. 9, 2017 issued over the corresponding Chinese Patent Application 201510870907.8.

*Primary Examiner* — Derek D Knight
(74) *Attorney, Agent, or Firm* — Carrier Blackman & Associates, P.C.; Joseph P. Carrier; William D. Blackman

(57) ABSTRACT

In a differential device distributing rotational force acting on a differential case to a pair of output shafts, the differential case including an input member and a cover portion, assembling precision of the differential device is enhanced by suppressing strain due to welding and press-fitting. The input member includes: a welded portion fitting the cover portion in axial direction and joined by welding; a press-fitted portion located inward of the welded portion in radial direction and axial direction and press-fitted to the cover portion; and a connecting surface connecting the welded portion and the press-fitted portion and forming a space between the connecting surface and the cover portion, the space allowing deformation of the press-fitted portion during press-fitting. The connecting surface includes one end portion continuous to the welded portion and extending outward from the welded portion in radial direction.

20 Claims, 16 Drawing Sheets

(56) References Cited

U.S. PATENT DOCUMENTS

| | | | |
|---|---|---|---|
| 6,413,183 B1 * | 7/2002 | Ishikawa | F16H 48/08 |
| | | | 475/160 |
| 6,470,988 B1 * | 10/2002 | Beesley | F16H 48/08 |
| | | | 180/245 |
| 6,964,629 B2 | 11/2005 | Tsung | |
| 8,814,742 B2 | 8/2014 | Uchida et al. | |
| 9,140,352 B2 | 9/2015 | Inukai et al. | |
| 2003/0184171 A1 | 10/2003 | Teraoka et al. | |
| 2010/0093482 A1 | 4/2010 | Allmendinger et al. | |
| 2010/0234160 A1 * | 9/2010 | Ishikawa | F16H 48/08 |
| | | | 475/161 |

FOREIGN PATENT DOCUMENTS

| | | |
|---|---|---|
| DE | 3437823 C2 | 4/1986 |
| JP | 1-37251 Y2 | 11/1989 |
| JP | 2005-048903 A | 2/2005 |
| JP | 2011-038546 A | 2/2011 |
| JP | 4803871 B2 | 10/2011 |
| JP | 5509910 B2 | 6/2014 |

* cited by examiner

DIFFERENTIAL DEVICE

BACKGROUND OF THE INVENTION

Field of the Invention

The present invention relates to an improvement of a differential device, particularly the differential device which includes a differential case; and a differential mechanism housed in the differential case and distributively transmitting rotational force of the differential case to a pair of mutually-independent output shafts.

Description of the Related Art

As such a differential device, Japanese Patent No. 5509910, for example, has made known a differential device in which, for example, a differential case includes: an input member having an input part that receives rotational force and formed in a cylindrical shape, an end portion of the input member on at least one side in an axial direction thereof being opened; and at least one cover portion covering the opened end portion of the input member on the one side in the axial direction. In this conventional device, an inner peripheral portion of a driven gear as the input part and an outer peripheral portion of the differential case are integrally joined together by a combination use of press-fitting means and welding means.

In joining the input part and the differential case together by a combination use of the press-fitting means and the welding means as in the conventional device, thermal strain occurs around welded portions during the welding, and also mechanical strain occurs around press-fitted portions during the press-fitting. Due to influences of the thermal strain and the mechanical strain, assembling precision of the input part and the differential case and accordingly the differential device as a whole may decrease.

In the above conventional device, the input part of the differential device in a certain layout or form, for example, in the form of a helical gear may cause thrust load from the input part side to act on the differential case to no small extent. In this case, stress tends to be concentrated on the welded portions which are boundary portions between the input part and the differential case, so that there is also a possibility of deterioration in durability of the welded portions, or the like.

Meanwhile, the same problems as described above occur also in a case of a combination use of the press-fitting means and the welding means to assemble constituent parts of the differential case, namely, a cylinder-shaped input member and cover portions covering open end portions of the input member.

SUMMARY OF THE INVENTION

The present invention has been made with the foregoing situation taken into consideration. An object of the present invention is to provide a differential device capable of solving the above-mentioned problem.

In order to achieve the object, a differential device according to the present invention, includes: a differential case; and a differential mechanism housed in the differential case and distributively transmitting rotational force of the differential case to a pair of mutually-independent output shafts, wherein the differential case includes an input member including an input part which receives the rotational force, an end portion of the input member on at least one side in an axial direction thereof being opened, and at least one cover portion covering the opened end portion of the input member on the one side in the axial direction, the input member includes a welded portion to which the cover portion is fitted in the axial direction of the input member and joined by welding, a press-fitted portion located inward of the welded portion in a radial direction and the axial direction of the input member, the cover portion being press-fitted to the press-fitted portion, and a connecting surface connecting the welded portion and the press-fitted portion and forming a space between the connecting surface and the cover portion, the space allowing deformation of the press-fitted portion during the press-fitting, and the connecting surface includes one end portion continuous to the welded portion, the one end portion extending outward from the welded portion in the radial direction. (This is a first characteristic of the present invention.)

In addition, in order to achieve the object, a differential device according to the present invention, distributively transmits rotational force of an input member to a pair of mutually-independent output shafts, the input member retaining a pinion support portion that supports a pinion and being rotatable together with the pinion support portion, the differential device comprising: a pair of side gears each having a tooth portion placed at an outer peripheral portion thereof in mesh with the pinion and connected to the pair of output shafts, respectively; and at least one cover portion attached to the input member and covering an outside of at least one side gear, wherein the input member includes a welded portion to which the cover portion is fitted in an axial direction of the input member and joined by welding, a press-fitted portion located inward of the welded portion in a radial direction and the axial direction of the input member, the cover portion being press-fitted to the press-fitted portion, and a connecting surface connecting the welded portion and the press-fitted portion and forming a space between the connecting surface and the cover portion, the space allowing deformation of the press-fitted portion during the press-fitting, and the connecting surface includes one end portion continuous to the welded portion, the one end portion extending outward from the welded portion in the radial direction. (This is a second characteristic of the present invention.)

In addition, in order to achieve the object, a differential device according to the present invention, distributively transmits rotational force of an input member to a pair of mutually-independent output shafts, the input member supporting a differential gear support portion that supports a differential gear and being rotatable together with the differential gear support portion, the differential device comprising: a pair of output gears each including a tooth portion placed at an outer peripheral portion thereof in mesh with the differential gear and connected to the pair of output shafts, respectively, and at least one cover portion attached to the input member and covering an outside of at least one output gear, wherein the input member includes a welded portion to which the cover portion is fitted in an axial direction of the input member and joined by welding, a press-fitted portion located inward of the welded portion in a radial direction and the axial direction of the input member, the cover portion being press-fitted to the press-fitted portion, and a connecting surface connecting the welded portion and the press-fitted portion and forming a space between the connecting surface and the cover portion, the space allowing deformation of the press-fitted portion during the press-fitting, and the connecting surface includes one end portion continuous to the welded portion, the one end portion extending outward from the welded portion in the radial direction, wherein $$d2/PCD \leq 3.36 \cdot \left(\frac{1}{z1}\right)^{\frac{2}{3}} \cdot \sin\left(\tan^{-1}\frac{z1}{z2}\right)$$

is satisfied, and

Z1/Z2>2 is satisfied, where Z1, Z2, d2 and PCD denote the number of teeth of each of the output gears, the number of teeth of the differential gear, a diameter of the differential gear support portion and a pitch cone distance, respectively. (This is a third characteristic of the present invention.)

According to the first to third characteristics, the input member of the differential case includes: the welded portion to which the cover portion is fitted in the axial direction of the input member and joined by welding; the press-fitted portion located inward of the welded portion in the radial and axial directions of the input member, the cover portion being press-fitted to the press-fitted portion; and the connecting surface connecting the welded portion and the press-fitted portion and forming the space between the connecting surface and the cover portion, the space allowing the deformation of the press-fitted portion during the press-fitting. This structure allows flexural deformation of the vicinity of the press-fitted portion of the input member during the press-fitting, and thereby makes it possible to ease mechanical strain in the vicinity of the press-fitted portion during the press-fitting, and to effectively prevent that assembling precision of the input member and the cover portion and accordingly assembling precision of the differential device as a whole decreases due to an influence of the strain. Furthermore, the one end portion of the connecting surface continuous to the welded portion extends outward from the welded portion in the radial direction. With this structure, even though the layout form or the like of the input member in the differential device causes thrust load from a drive source side to the rotating input member to no small extent, stress due to the thrust load can be dispersed on the extending portion side of the connecting surface. This makes it possible to effectively prevent the stress from being concentrated on the welded portion of the input member and the cover portion, and to avoid deterioration in durability of the welded portion due to the stress concentration.

Moreover, according to the third characteristic, the differential device as a whole can be sufficiently reduced in width in the axial direction of the output shafts while securing the strength (for example, the static torsion load strength) and the maximum amount of torque transmission at approximately the same levels as the conventional differential device. Accordingly, the differential device can be easily incorporated in a transmission system, which is under many layout restrictions around the differential device, with great freedom and no specific difficulties, and is therefore advantageous in reducing the size of the transmission system.

In the differential device according to the present invention, preferably, part of the press-fitted portion and the space are disposed overlapping each other as seen in the radial direction from a center of rotation of the input member. (This is a fourth characteristic of the present invention.)

According to the fourth characteristic, the part of the press-fitted portion and the space are disposed overlapping each other as seen in the radial direction from the center of rotation of the input member. This makes it easier to flexurally deform the vicinity of the press-fitted portion of the input member outward in the radial direction during the press-fitting, and makes it possible to effectively ease the strain due to the press-fitting and to more effectively prevent that the assembling precision of the input member and the cover portion decreases due to the influence of the strain.

In the differential device according to the present invention, preferably, the cover portion includes a boss portion concentrically surrounding the output shafts, and a side wall portion connected to the boss portion so as to extend outward in the radial direction from the boss portion, a large-diameter portion and a small-diameter portion are formed in an outer peripheral portion of the side wall portion, the large-diameter portion being fitted to and joined by welding to the welded portion, and the small-diameter portion being continuous to an axial inner end of the large-diameter portion via a step surface and press-fitted into the press-fitted portion, an axial outer end of the press-fitted portion is abutted against or comes close to the step surface, and the connecting surface includes an inclined portion which gradually separates from the step surface as the connecting surface goes outward in the radial direction from the axial outer end or a vicinity of the axial outer end. (This is a fifth characteristic of the present invention.)

According to the fifth characteristic, the cover portion includes: the boss portion concentrically surrounding the output shafts; and the side wall portion connected to the boss portion so as to extend outward in the radial direction from the boss portion. In addition, the large-diameter portion and the small-diameter portion are formed in the outer peripheral portion of the side wall portion, the large-diameter portion being fitted to and joined by welding to the welded portion, and the small-diameter portion being continuous to the axial inner end of the large-diameter portion via the step surface and press-fitted into the press-fitted portion. Furthermore, the axial outer end of the press-fitted portion is abutted against or comes close to the step surface, and the connecting surface includes the inclined portion which gradually separates from the step surface as the connecting surface goes outward in the radial direction from the axial outer end of the press-fitted portion or the vicinity of the axial outer end of the press-fitted portion. These make it easier to flexurally deform the vicinity of the press-fitted portion of the input member outward in the radial direction while securing sufficiently an area where the small-diameter portion is press-fitted to and in contact with the press-fitted portion.

In the differential device according to the present invention, preferably, Z1/Z2≥4 is satisfied. (This is a sixth characteristic of the present invention.)

In the differential device according to the present invention, preferably, Z1/Z2≥5.8 is satisfied. (This is a seventh characteristic of the present invention.)

According to the sixth and seventh characteristics, the differential device can be more sufficiently reduced in width in the axial direction of the output shafts while securing the strength (for example, the static torsion load strength) and the maximum amount of torque transmission at approximately the same levels as the conventional differential device.

The above and other objects, characteristics and advantages of the present invention will be clear from detailed descriptions of the preferred embodiments which will be provided below while referring to the attached drawings.

DESCRIPTION OF THE PREFERRED EMBODIMENTS

Figure 1:
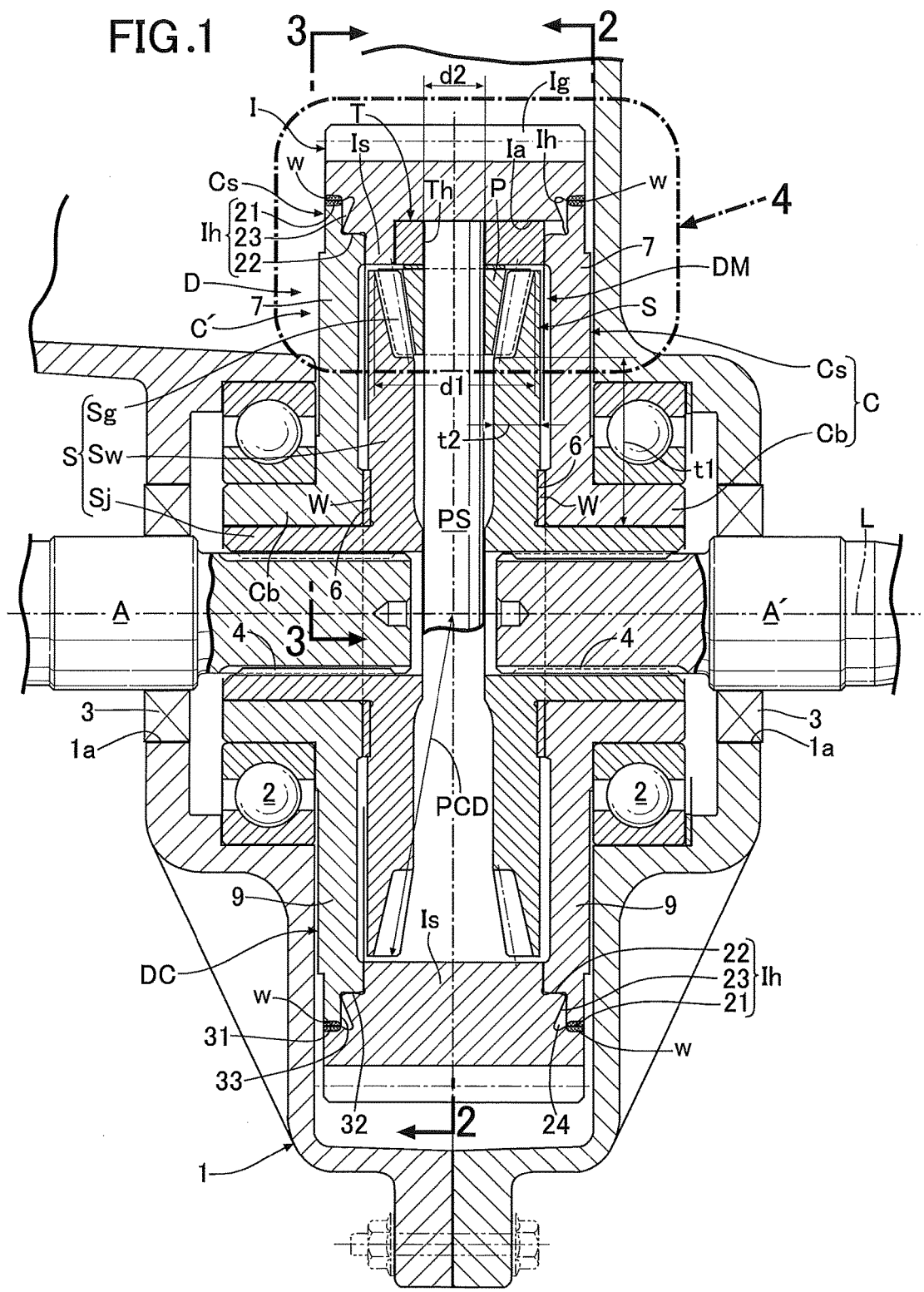
FIG. 1 is a longitudinal sectional view of a differential device according to a first embodiment of the present invention and its vicinity (a sectional view taken along a 1-1 line in FIG. 2).

Embodiments of the present invention will be hereinbelow described based on preferred examples of the present invention which are shown in the attached drawings.

First of all, referring to FIGS. 1 to 5, descriptions will be provided for a first embodiment of the present invention. A differential device D drives a pair of left and right axles while allowing their differential rotation by distributively transmitting, to a pair of left and right output shafts A, A', rotational driving force which is transmitted from an engine (not illustrated) mounted on an automobile, the pair of left and right output shafts A, A' being continuous to the pair of left and right axles. The differential device D is housed and supported, for example, inside a transmission case 1 disposed beside the engine in a front portion of a vehicle body.

The differential device D includes: an input tooth portion Ig as a final driven gear receiving the rotational force from the engine; a differential case DC rotating integrally with the input tooth portion Ig; and a differential mechanism DM housed in the differential case DC and distributively transmitting, to the pair of left and right output shafts A, A', the rotational force which is transmitted from the input tooth portion Ig to the differential case DC.

The differential mechanism DM includes: a plurality of pinions (differential gears) P; a pinion shaft PS as a pinion support portion (a differential gear support portion) rotatably supporting the pinions P; an input member I supporting the pinion shaft PS so as to be rotatable together with the pinion shaft PS and having a short cylindrical shape; and a pair of left and right side gears (output gears) S being in mesh with the pinions P from both the left and right sides and connected respectively to the pair of left and right output shafts A, A'. In addition, at least one end portion (both end portions in the illustrated example) in an axial direction of the input member I is opened. A pair of left and right cover portions C, C' closing the opening portions of the input member I and covering outer sides of the both respective side gears S are connected to the input member I so as to be rotatable integrally with the input member I. Thus, a differential case DC is formed from the input member I and the cover portions C, C'.

Incidentally, the embodiment shows the differential device D which includes two pinions P, and whose pinion shaft PS as the pinion support portion is formed in a linear rod shape extending along one diameter line of the input member I with the two pinions P respectively supported by both end portions of the pinion shaft PS. Instead, the differential device D may include three or more pinions P. In this case, the pinion shaft PS is formed in a shape of crossing rods such that rods extend radially from a rotation axis L of the input member I in three or more directions corresponding to the three or more pinions P (for example, in a shape of a cross when the differential device D includes four pinions P), and tip end portions of the extending rods of the pinion shaft PS support the pinions P, respectively.

In addition, the pinions P may be fitted to the pinion shaft PS directly as shown in the illustrated example, or a bearing means (not illustrated), such as a bearing bush and the like, may be inserted between the pinion shaft PS and each pinion P. Furthermore, the pinion shaft PS may be formed in a shape of a shaft whose diameter is substantially equal throughout its whole length, or formed in a shape of a stepped shaft. Furthermore, recessed portions to be used as oil passages may be provided to outer peripheries of the pinion shaft PS which are fitted to the pinions P, respectively.

The differential case DC is rotatably supported by the transmission case 1 via left and right bearings 2. Moreover, through-holes 1a inserted with the output shafts A, A' are formed in the transmission case 1. Seal members 3 sealing interstices between inner peripheries of the through-holes 1a and outer peripheries of the output shafts A, A' and being formed in an annular shape are interposed between the inner peripheries and the outer peripheries. Furthermore, an oil pan (not illustrated) facing an inner space of the transmission case 1 and reserving a predetermined amount of lubricant oil is provided in a bottom portion of the transmission case 1. Mechanical interlocking sections existing inside and outside the differential case DC can be lubricated with the lubricant oil which is scattered around the differential device D in the transmission case 1 by rotation of the differential case DC and the other rotary members.

The input tooth portion Ig as the final driven gear is provided in an outer peripheral portion of the input member I. The input tooth portion Ig is in mesh with a drive gear (not illustrated) which is rotationally driven by power of the engine. Moreover, in this embodiment, the input tooth portion Ig is formed as a helical gear. In the present invention, however, the input tooth portion Ig does not necessarily have to be formed as a helical gear, and may be formed as a normal spur gear. Incidentally, in the embodiment, the input tooth portion Ig is formed in an outer peripheral surface of the input member I over a full lateral width of the input member I (i.e., an overall axial width of the input member I). Instead, however, the input tooth portion Ig may be formed to have the width smaller than that of the input member I.

Meanwhile, in the embodiment, the pinions P and the side gears S are each formed as a bevel gear. In addition, each pinion P as a whole and each side gear S as a whole, including their tooth portions, are formed by plastic working such as forging and the like. For these reasons, their tooth portions with an arbitrary gear ratio can be precisely formed without restriction in machining work such that the tooth portions of the pinions P and the side gears S are formed by cutting work. Incidentally, other types of gears may be used instead of the bevel gear. For example, a face gear may be used for the side gears S, while a spur gear or a helical gear may be used for the pinions P.

In addition, the pair of side gears S each include: a shaft portion Sj to which an inner end portion of the corresponding one of the pair of output shafts A, A' is connected by being spline-fitted as at 4 and being formed in a cylindrical shape; a tooth portion Sg situated at a position separated outward from the shaft portion Sj in a radial direction of the input member I, being in mesh with the corresponding pinion P and being formed in an annular shape; and an intermediate wall portion Sw formed in a flat ring plate shape orthogonal to the axis L of the output shafts A, A' and integrally joining the shaft portion Sj and the tooth portion Sg.

The intermediate wall portion Sw of the side gear S is formed with a width t1 of the intermediate wall portion Sw in the radial direction larger than a maximum diameter d1 of the pinion P, and with a maximum thickness t2 of the intermediate wall portion Sw in an axial direction of the output shafts A, A' smaller than an effective diameter d2 of the pinion shaft PS (see FIG. 1). Thereby, as described later, a diameter of the side gear S can be made large enough to set the number Z1 of teeth of the side gear S sufficiently larger than the number Z2 of teeth of the pinions P, and the side gear S can be sufficiently thinned in the axial direction of the output shafts A, A'. Incidentally, the present specification defines the "effective diameter d2" as an outer diameter d2 of a shaft (i.e., the pinion shaft PS, or a later-described support shaft portion PS') as the pinion support portion which is formed separately from or integrally with the pinions P, supports the pinions P and is attached to the input member I.

Besides, the pair of cover portions C, C' are each formed separately from the input member I, and are each welded to the input member I as described later. Each of the cover portions C, C' includes: a boss portion Cb which concentrically surrounds the shaft portion Sj of the side gear S, in which the shaft portion Sj is rotatably fitted and supported and being formed in a cylindrical shape; and a side wall portion Cs having an outer side surface which is a flat surface orthogonal to the rotation axis L of the input member I, the side wall portion Cs integrally connected to an inner end in an axial direction of the boss portion Cb and being formed in a plate shape.

Figure 4:
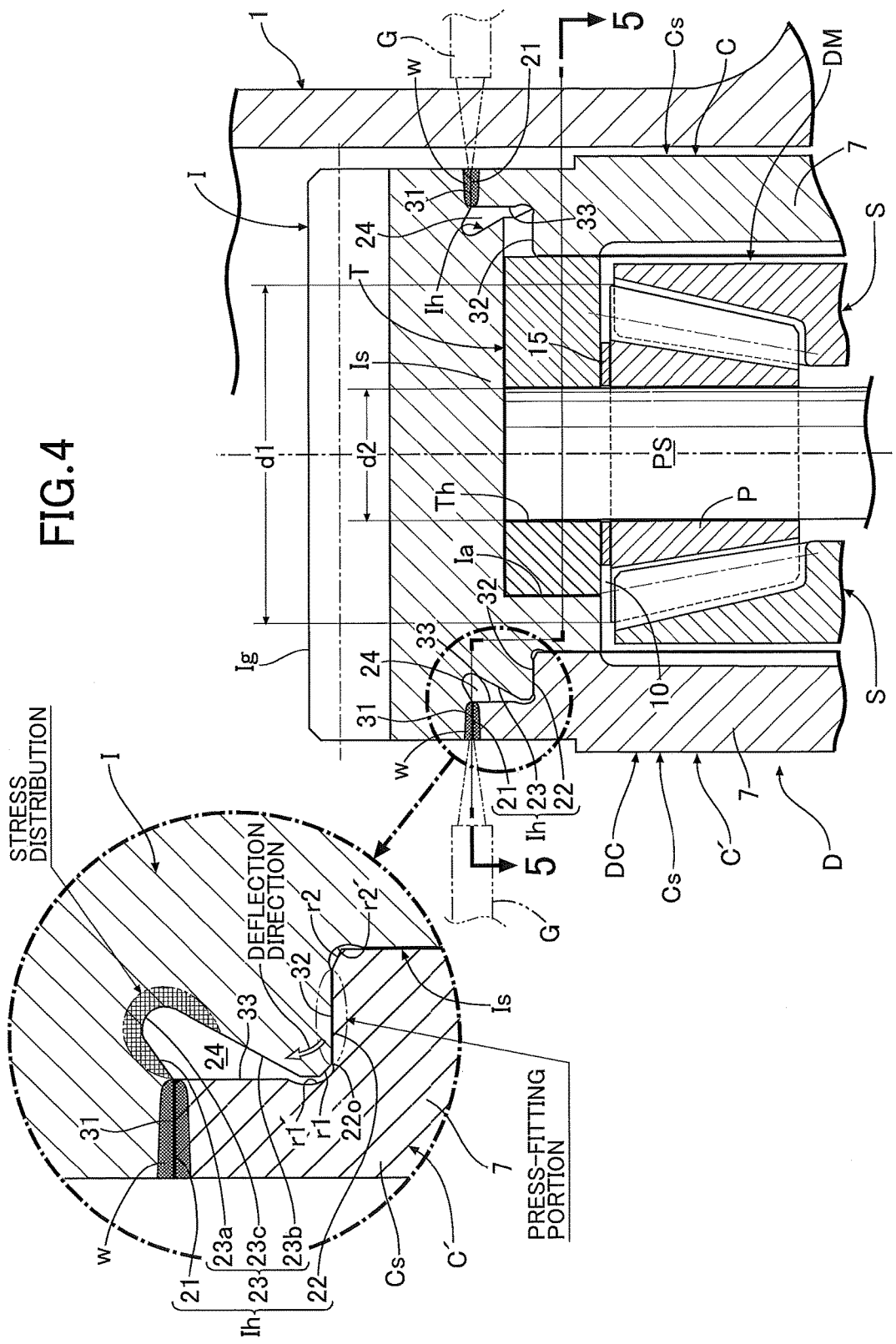
FIG. 4 is an enlarged view of a part indicated with an arrow 4 in FIG. 1.
Figure 5:
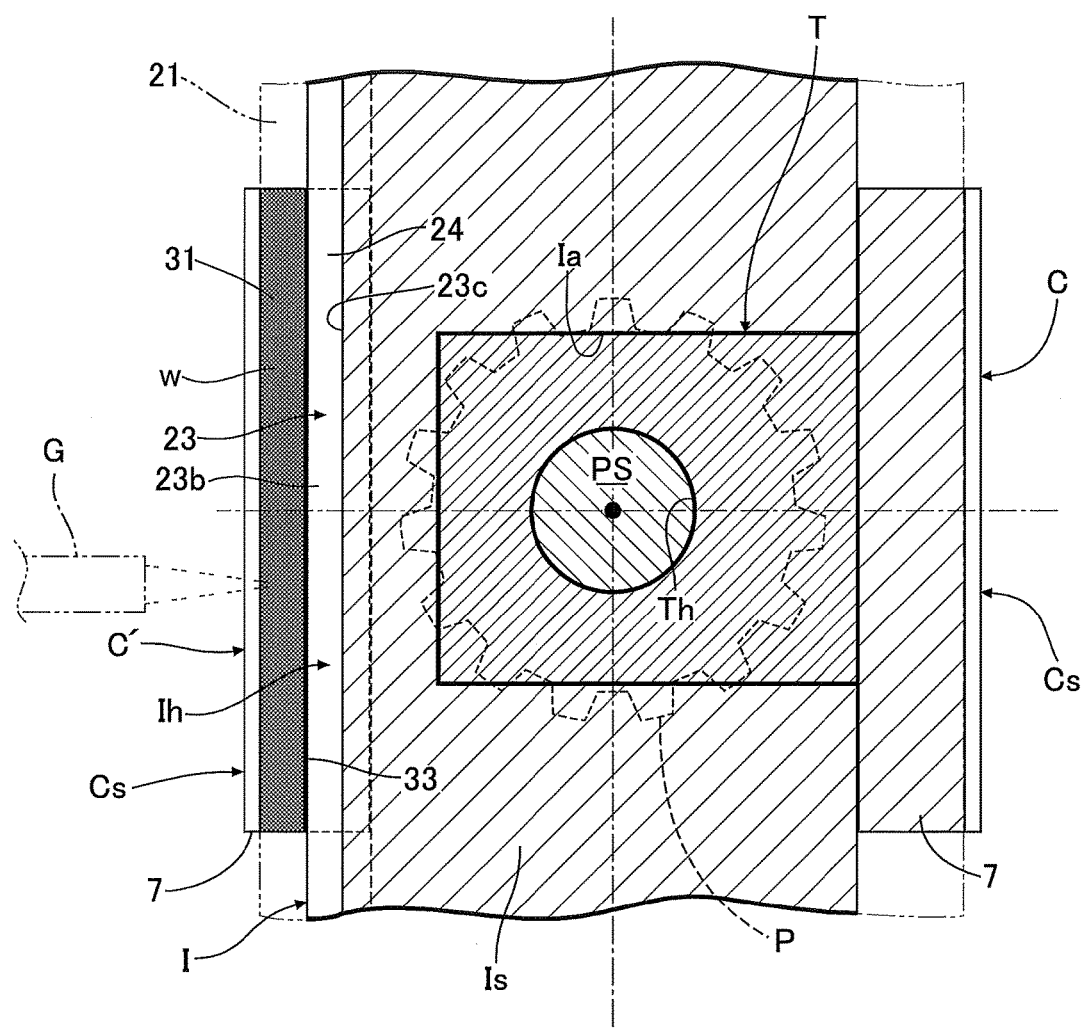
FIG. 5 is a sectional view taken along a 5-5 line in FIG. 4.

Next, referring to FIGS. 4 and 5 together, descriptions will be provided for a structure for attaching the pinion shaft PS to the input member I. A support wall portion Is having an annular shape and supporting the pinion shaft PS as the pinion support portion is integrally projected from an entire periphery of an inner peripheral portion of the input member I. The support wall portion Is is formed with its width smaller than an overall width of the input member I in the axial direction of the output shafts A, A'. In addition, a pair of attachment holes Ih are formed in the input member I so as to be each opened in both outer side surfaces of the input member I, the attachment holes Ih being adjacent to the both outer side surfaces of the support wall portion Is and each formed in a circular stepped hole shape. Outer peripheral portions of the cover portions C, C' are respectively attached to inner peripheral walls of the both attachment holes Ih.

The both end portions of the pinion shaft PS are connected to and supported on the support wall portion Is of the input member I via attachment bodies T, respectively. Retaining holes Th are respectively formed in the attachment bodies T so that an entire periphery of the corresponding end portion of the pinion shaft PS can be fitted and retained. Furthermore, attachment grooves Ia each having a cross section with an angular U-shape are provided in a recess shape in the inner peripheral surface of the support wall portion Is, each of the attachment grooves Ia having an opening in a side surface of the support wall portion Is on the one cover portion C side and extending in the axial direction of the output shafts A, A'. Each attachment body T having a rectangular parallelepiped shape is inserted into the corresponding attachment groove Ia from the opening.

The attachment bodies T are fixed to the input member I by, as described later, press-fitting and welding the outer peripheral portion of the one cover portion C to the corresponding attachment hole Ih of the input member I with the attachment bodies T inserted in the attachment grooves Ia of the support wall portion Is. In addition, thrust washers 15 are installed between the attachment bodies T and large diameter-side end surfaces of the pinions P, the thrust washers 15 allowing relative rotation therebetween and being formed in an annular shape.

The above-described structure for attaching the pinion shaft PS to the input member I enables the pinion shaft PS to be easily and firmly connected and fixed to the attachment grooves Ia in the input member I by use of the block-shaped attachment bodies T in which the entire peripheries of the end portions of the pinion shaft PS are fitted and retained. For this reason, the pinion shaft PS can be connected to and supported by the input member I with high strength, with no specialized through-hole for supporting the pinion shaft PS formed in the input member I, and without decreasing assembly workability. Furthermore, the embodiment achieves structure simplification since the cover portion C covering the outer side of the corresponding side gear S concurrently serves as the fixing means for retaining the attachment body T.

Thereby, when the both end portions of the pinion shaft PS are connected to and supported by the input member I via the attachment bodies T, clearances 10 in the radial direction of the input member I are formed between the large diameter-side end surfaces of the pinions P rotatably supported by the pinion shaft PS and the inner peripheral surface of the input member I. This makes it easy for the lubricant oil to be reserved in the clearances 10, and is accordingly effective to prevent seizure in end portions of the pinions P facing the clearances 10 and their vicinities.

Figure 2:
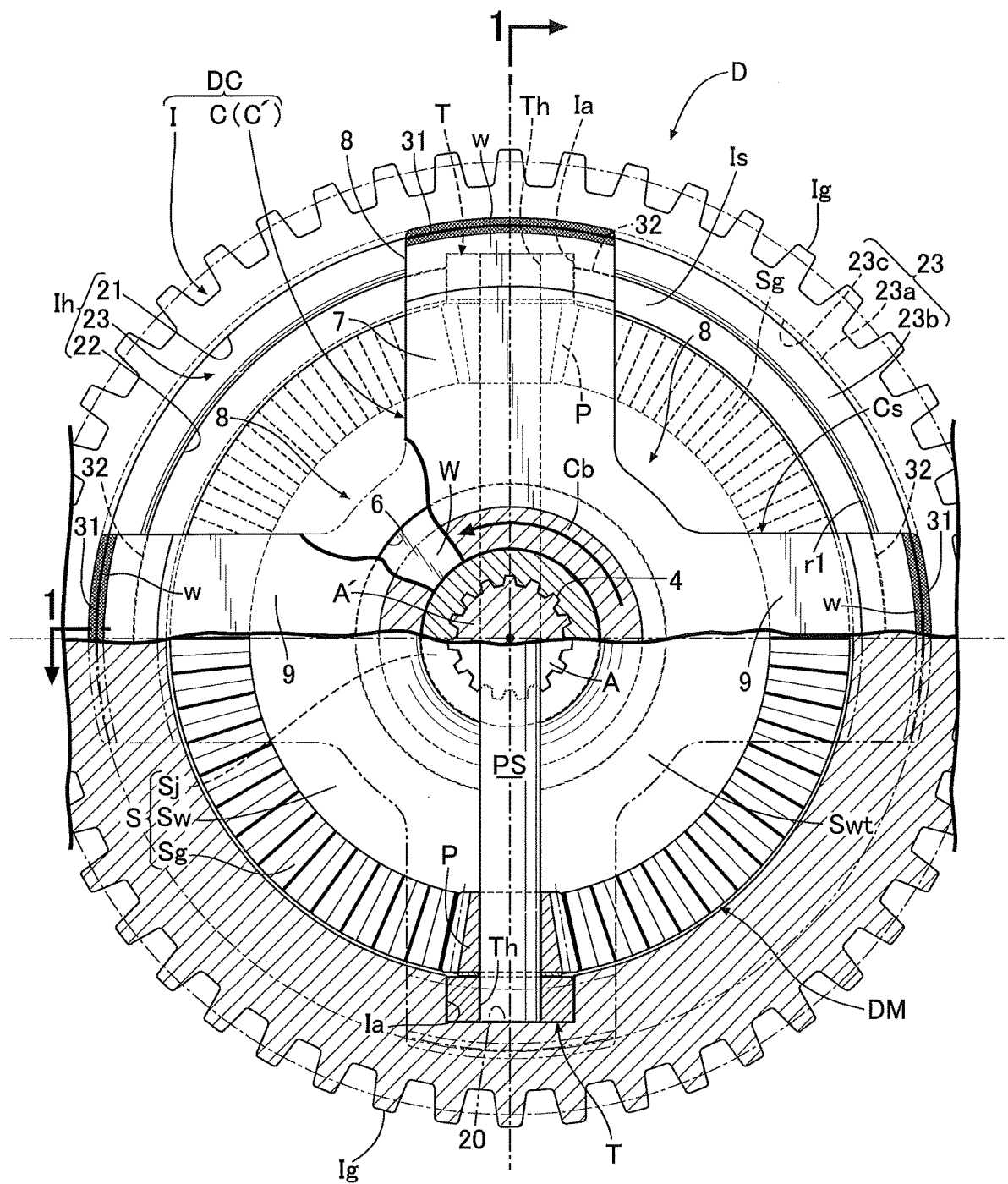
FIG. 2 is a partial cutaway side view on an axial one side of the differential device according to the first embodiment of the present invention (a sectional view taken along a 2-2 line in FIG. 1).

Meanwhile, the side wall portion Cs of the one cover portion C has a structure having oil retaining portions 7 covering a back surface of the side gear S in first predetermined areas including areas which overlap the pinions P as seen in a side view from outside in the axial direction of the output shafts A, A' (i.e., as seen in FIG. 2), having lightening portions 8 exposing the back surface of the side gear S to the outside of the differential case DC in second predetermined areas which do not overlap the pinions P as seen in the side view and having connecting arm portions 9 being separated from the oil retaining portions 7 in the peripheral direction of the input member I and extending in the radial direction of the input member I to connect the boss portion Cb and the input member I. In other words, the side wall portion Cs basically having a disk shape in the cover portion C has a structural form in which: the plurality of lightening portions 8 each having a cutout shape are formed in the side wall portion Cs at intervals in the peripheral direction; and thereby, one oil retaining portion 7 and one connecting arm portion 9 are formed respectively on opposite sides of the lightening portion 8 in the peripheral direction.

The structural form of the side wall portion Cs of the cover portion C, particularly the oil retaining portions 7, makes it possible for the lubricant oil, which tends to move outward in the radial direction due to centrifugal force produced by rotation of the input member I, to be easily stayed in spaces covered by the oil retaining portions 7 and the input member I, and to be easily retained on the pinions P and in their vicinities. In addition, since the cover portion C includes the lightening portions 8, the lubricant oil can be distributed to the inside and outside of the differential case DC via the lightening portions 8. Thus, the lubricant oil is changed and cooled appropriately, thereby effectively preventing degradation of the lubricant oil. Furthermore, since a large amount of lubricant oil need not be confined inside the differential case DC, and since the cover portion C itself is reduced in weight by an amount of the forming of the lightening portions 8, reduction in the weight of the differential device D can be accordingly achieved.

It should be noted that although in the embodiment, the lightening portions 8 are each formed in the cutout shape which is opened on the outer peripheral end side of the side wall portion Cs, the lightening portions 8 may be instead each formed in a through-hole shape which is not opened on the outer peripheral end side thereof.

Figure 3:
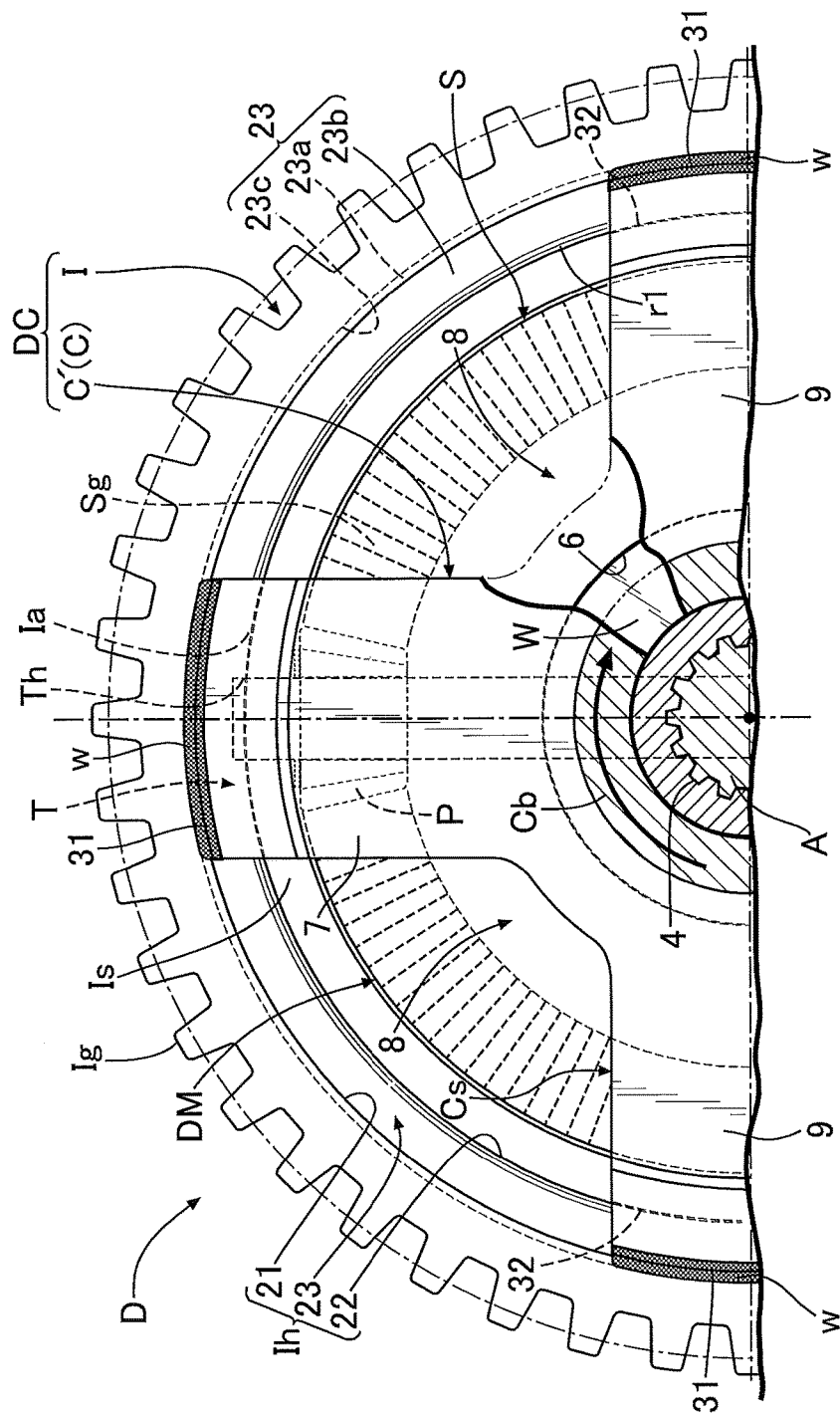
FIG. 3 is a side view of a main part on an axial other side of the differential device according to the first embodiment of the present invention (a sectional view taken along a 3-3 line in FIG. 1).

Meanwhile, as being clear from FIG. 3, in this embodiment, the lightening portions 8 are formed in the side wall portion Cs of the other cover portion C', like in the side wall portion Cs of the one cover portion C. Incidentally, various modified embodiments can be devised for the form of the lightening portions 8 (accordingly, the oil retaining portions 7 and the connecting arm portions 9) of the cover portions C, C', and the form of the lightening portions 8 is not limited to the embodiment shown in FIGS. 2 and 3.

Next, referring to FIGS. 4 and 5 together, a structure for fixing the cover portions C, C' to the input member I will be described concretely.

As described previously, the stepped hole-shaped attachment holes Ih in which to attach the cover portions C, C' such that the cover portions C, C' are put adjacent to the outer side surfaces of the support wall portion Is are formed in the input member I. The inner peripheral walls of the attachment holes Ih respectively include: welded portions 21 having a large diameter and to which outer peripheral portions of the side wall portions Cs of the cover portions C, C' (i.e., outer end portions of the oil retaining portions 7 and outer end portions of the connecting arm portions 9) are fitted and welded in the axial direction of the input member I; press-fitted portions 22 located inward of the welded portions 21 in the radial and axial directions of the input member I and to which the outer peripheral portions of the cover portions C, C' are press-fitted; and connecting surfaces 23 connecting the welded portions 21 and the press-fitted portions 22 and forming spaces 24 between the connecting surfaces 23 and the cover portions C, C', the spaces 24 allowing deformation of the press-fitted portions 22 during the press-fitting.

In addition, each connecting surface 23 includes one end portion continuous to the corresponding welded portion 21, the one end portion extending outward from the welded portion 21 in the radial direction so as to form an extending portion 23a. The extending portion 23a faces the corresponding space 24. Furthermore, the space 24 and at least part of the corresponding press-fitted portion 22 are disposed so as to overlap each other as seen in the radial direction from the center of rotation of the input member I (i.e., so as to be located in the same area in the axial direction).

Furthermore, in the outer peripheral portions of the side wall portions Cs of the cover portions C, C' (i.e., the outer end portions of the oil retaining portions 7 and the outer end portions of the connecting arm portions 9), a large-diameter portion 31 and a small-diameter portion 32 are formed, the large-diameter portion 31 being fitted and welded to the welded portion 21 of the input member I, and the small-diameter portion 32 continuous to an axial inner end of the large-diameter portion 31 via a step surface 33 and press-fitted into the press-fitted portion 22. Moreover, an axial outer end 22o of the press-fitted portion 22 is abutted against or comes close to (in the illustrated case, comes close to) the step surface 33.

Furthermore, the connecting surface 23 of the input member I includes an inclined portion 23b which gradually separates from the step surface 33 as the inclined portion 23b goes outward in the radial direction from a vicinity of the axial outer end 22o of the press-fitted portion 22. In addition, the inclined portion 23b and the above-described extending portion 23a are smoothly connected to each other via an intermediate curved portion 23c formed in a circular arc shaped cross section on respective outer end sides in the radial direction of the inclined portion 23b and the extending portion 23a. Incidentally, the inclined portion 23b may be formed such that: the inclined portion 23b starts at the axial outer end 22o of the press-fitted portion 22; and the inclined portion 23b gradually separates from the step surface 33 as the inclined portion 23b goes outward in the radial direction.

Meanwhile, a first chamfer r1 is formed in a connecting portion between the connecting surface 23 and the press-fitted portion 22 in the input member I. Corresponding to the first chamfer r1, a first recessed portion r1' facing the first chamfer r1 via a small gap in such a way to avoid the first chamfer r1 is formed in the step surface 33 of each of the cover portions C, C'. In addition, a second chamfer r2 is formed in a connecting portion between an inner side surface of each of the cover portions C, C' and the small-diameter 32. Corresponding to the second chamfer r2, a second recessed portion r2' facing the second chamfer r2 via a small gap in such a way to avoid the second chamfer r2 is formed in a connecting portion between the press-fitted portion 22 and the outer side surface of the support wall portion Is in the input member I.

Next, descriptions will be provided for an operation of the first embodiment. In the differential device D of this embodiment, in a case where the input member I receives rotational force from the engine, when the pinion P revolves around the axis L of the input member I together with the input member I without rotating around the pinion shaft PS, the left and right side gears S are rotationally driven at the same speed, and their driving forces are evenly transmitted to the left and right output shafts A, A'. Meanwhile, when a difference in rotational speed occurs between the left and right output shafts A, A' due to turn traveling or the like of the automobile, the pinion P revolves around the axis L of the input member I while rotating around the pinion shaft PS. Thereby, the rotational driving force is transmitted from the pinion P to the left and right side gears S while allowing differential rotations. The above is the same as the operation of the conventional differential device.

In addition, in a case where the power of the engine is transmitted to the left and right output shafts A, A' via the differential device D while the automobile is traveling forward, the lubricant oil is forcefully splashed in various places inside the transmission case 1 due to rotation of the differential case DC in a normal rotation direction (direction of a thick arrow in FIGS. 2 and 3). Part of the splashed lubricant oil flows into the inner sides of the cover portions C, C' through the lightening portions 8. Thereby, meshing portions of the pinions P and the side gears S and sliding portions of the pinions P can be effectively lubricated.

Meanwhile, in this embodiment, the outer peripheral portions of the side wall portions Cs of the cover portions C, C' (i.e., the outer end portions of the oil retaining portions 7 and the outer end portions of the connecting arm portions 9) are attached and fixed to the attachment holes Ih of the input member I by press-fitting and welding. The attaching and fixing work is performed in a state where the attachment bodies T are beforehand set on the end portions of the pinion shaft PS and then fitted into and supported in the attachment grooves Ia of the support wall portion Is of the input member I.

Next, the attaching and fixing work will be described concretely. To begin with, the small-diameter portions 32 of the cover portions C, C' are press-fitted into the press-fitted portions 22 of the attachment holes Ih of the input member I in the axial direction, and the large-diameter portions 31 of the cover portions C, C' are fitted to the welded portions 21 of the attachment holes Ih. Thereafter, the fitting portions, that is, abutment portions between the welded portions 21 and the large-diameter portions 31 where the welded portions 21 and the large-diameter portions 31 are abutted against each other are respectively joined together by butt welding w from the outside of the cover portions C, C'.

The welding work is performed, for example, by slowly rotating the input member around its rotation axis L while, as shown in FIGS. 4 and 5, irradiating laser beams respectively toward outer ends of the abutment portions from welding laser torches G disposed outside the cover portions C, C'. Thereby, using energy of the laser beams, the welded portions 21 of the attachment holes Ih and the large-diameter portions 31 of the cover portions C, C' can be joined together by the butt welding w. Incidentally, in this case, when the input member 1 is rotated while the pair of laser torches G is disposed outside the both cover portions C, C', respectively, the large-diameter portions 31 of the left and right cover portions C, C' can be joined to the welded portions 21 of the pair of left and right attachment holes Ih of the input member I by butt welding w at the same time. Thus, efficiency of the welding work can be enhanced.

Meanwhile, in this embodiment, the inner peripheral walls of the attachment holes Ih of the input member I respectively include: the welded portions 21 having the large diameter and to which the outer peripheral portions of the cover portions C, C' (i.e., the outer end portions of the oil retaining portions 7 and the outer end portions of the connecting arm portions 9) are fitted in the axial direction of the input member I and welded; the press-fitted portions 22 located inward of the welded portions 21 in the radial and axial directions of the input member I and to which the outer peripheral portions of the cover portions C, C' are press-fitted; and the connecting surfaces 23 connecting the welded portions 21 and the press-fitted portions 22 and forming the spaces 24 between the connecting surfaces 23 and the cover portions C, C', the spaces 24 allowing the deformation (accordingly, displacement) of the press-fitted portions 22 during the press-fitting. This allows slight flexural deformation of the vicinities of the press-fitted portions 22 of the input member I in the radial direction during the press-fitting, and eases mechanical strain in the vicinities of the press-fitted portions 22 during the press-fitting. For this reason, it is possible to effectively prevent that the assembling precision of the input member I and the cover portions C, C', and accordingly the differential device D as a whole decreases due to the influence of the strain.

In addition, when the input member I of the differential device D employs a certain layout, form or the like (for example, the form of a helical gear as the input tooth portion Ig in this embodiment), thrust load from the drive source side may act on the rotating input member I to no small extent. In the embodiment, the connecting surfaces 23 in the attachment holes Ih includes end portions continuous to the welded portions 21, the end portions extending outward in the radial direction from the welded portions 21 so as to form the extending portions 23a. Thus, even in the above case, stress due to the thrust load can be dispersed on the extending portion 23a sides, and consequently can be effectively prevented from causing stress concentration in the butt welded portions w between the input member I and the cover portions C, C'. For this reason, it is possible to avoid deterioration in the durability of the welded portions w due to the stress concentration. Furthermore, each space 24 and at least part of each press-fitted portion 22 are disposed so as to overlap each other as seen in the radial direction from the center of rotation of the input member I (i.e., so as to be located in the same area in the axial direction). This makes it easier to flexurally deform the vicinities of the press-fitted portions 22 of the input member 1 outward in the radial direction during the press-fitting, effectively eases the strain due to the press-fitting, and therefore effectively inhibits decrease in the assembling precision of the input member I and the cover portions C, C' due to the influence of the strain.

Furthermore, in the embodiment, in the outer peripheral portion of the side wall portion Cs of each of the cover portions C, C' (i.e., the outer end portions of the oil retaining portions 7 and the outer end portions of the connecting arm portions 9), the large-diameter portion 31 and the small-diameter portion 32 are formed, the large-diameter portion 31 being fitted and welded to the welded portion 21 of the input member I, and the small-diameter portion 32 being continuous to the axial inner end of the large-diameter portion 31 via the step surface 33 and press-fitted to the press-fitted portion 22. Moreover, the outer end 22o of the press-fitted portion 22 is abutted against or comes close to the step surface 33. In addition, the connecting surface 23 includes the inclined portion 23b which gradually separates from the step surface 33 as the inclined portion 23b goes outward in the radial direction from the outer end 22o of the press-fitted portion 22 or the vicinity of the outer end 22o.

Thus, it is possible to more easily flexurally deform the vicinity of the press-fitted portion 22 of the input member I outward in the radial direction while securing the sufficient area where the small-diameter portion 32 is press-fitted to and in contact with the press-fitted portion 22.

Thus, in the differential device D of this embodiment, each side gear S includes: the shaft portion Sj connected to each of the output shafts A, A'; and the intermediate wall portion Sw formed in a flat ring plate shape orthogonal to the axis L of the output shafts A, A', and integrally connecting the shaft portion Sj and the side gear tooth portion Sg which is separated outward from the shaft portion Sj in the radial direction of the input member I. Furthermore, the intermediate wall portion Sw is formed in the way that a width t1 of the intermediate wall portion Sw in the radial direction is longer than a maximum diameter d1 of each pinion P. For these reasons, relative to the pinions P, the diameter of the side gear S can be made large enough to set the number Z1 of teeth of the side gear S sufficiently larger than the number Z2 of teeth of the pinions P. This makes it possible to reduce load burden to the pinion shaft PS while the torque is being transmitted from the pinions P to the side gears S, thus to decrease the effective diameter d2 of the pinion shaft PS, and accordingly to decrease the width of the pinions P in the axial direction of the output shafts A, A'.

In addition, since the load burden to the pinion shaft PS is reduced as describe above, since reaction force applied to each side gear S decreases, and since the back surface of the intermediate wall portion Sw or the tooth portion Sg of the side gear S is supported by the corresponding cover side wall portion Cs, it is easy to secure the rigidity strength needed for the side gear S even though the intermediate wall portion Sw of the side gear S is thinned. That is to say, it is possible to sufficiently thin the side gear intermediate wall portion Sw while securing the support rigidity with respect to the side gear S. Moreover, in the embodiment, since the maximum thickness t2 of the side gear intermediate wall portion Sw is formed much smaller than the effective diameter d2 of the pinion shaft PS whose diameter can be made smaller as described above, the further thinning of the side gear intermediate wall portion Sw can be achieved. Besides, since the cover side wall portion Cs is formed in a plate shape such that the outer side surface thereof is the flat surface orthogonal to the axis L of the output shafts A, A', the thinning of the cover side wall portion Cs itself can be achieved.

As a result of these, the width of the differential device D as a whole can be sufficiently decreased in the axial direction of the output shafts A, A' while securing approximately the same strength (for example, static torsion load strength) and approximately the same amount of maximum torque transmission compared with the conventional differential device. This makes it possible to easily incorporate the differential device D, with great freedom and without trouble, even when a transmission system imposes many restrictions on the layout of the vicinity of the differential device D, and is extremely advantageous in reducing the size of the transmission system.

Figure 6:
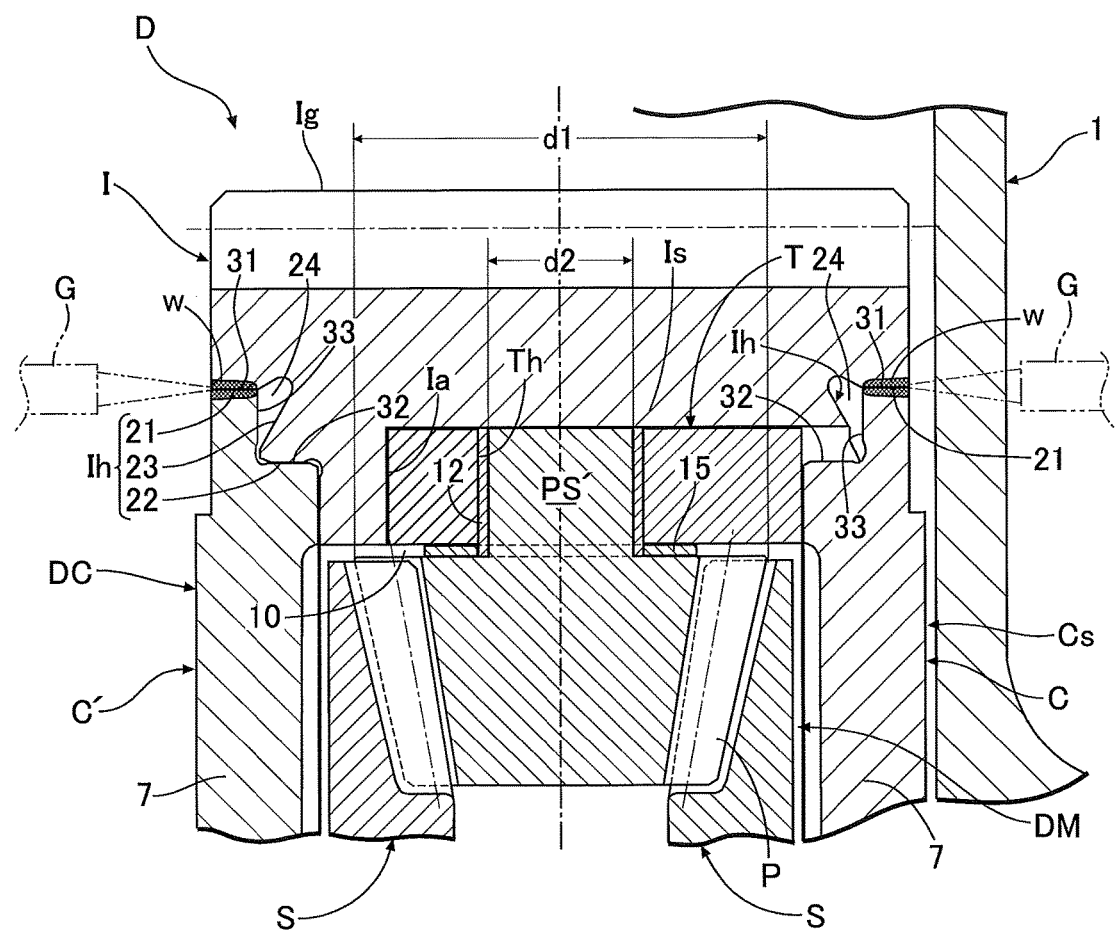
FIG. 6 is a partial sectional view showing a pinion support portion of a differential device according to a second embodiment of the present invention and corresponding to FIG. 4.

Meanwhile, although the first embodiment described above shows that the long pinion shaft PS is used as the pinion support portion (the differential gear support portion), a second embodiment of the present invention as illustrated in FIG. 6 shows that the pinion support portion (the differential support portion) is formed from a support shaft portion PS' coaxially and integrally connected to a large diameter-side end surface of the pinion P. According to this configuration, because the through-hole into which the pinion shaft PS is fitted need not be provided to the pinion P, the diameter of the pinion P can be accordingly decreased (the width thereof can be decreased in the axial direction), and the differential device D can be flattened in the axial direction of the output shafts A, A'. In other words, when the pinion shaft PS is penetrated through the pinion P, it is necessary to form in the pinion P the through-hole with a size corresponding to the pinion shaft diameter. However, when the support shaft portion PS' is integrated with the end surface of the pinion P, it is possible to decrease the diameter of the pinion P (to decrease the width thereof in the axial direction) without depending on a diameter of the support shaft portion PS'.

Moreover, in this second embodiment, a bearing bush 12 as a bearing allowing relative rotations between the support shaft portion PS' and the attachment body T is inserted between an outer peripheral surface of the support shaft portion PS' and an inner peripheral surface of the retaining hole Th of the corresponding attachment body T into which the support shaft portion PS' is inserted. Incidentally, the bearing may be formed from a needle bearing or the like. In addition, the bearing may be omitted so that the support shaft portion PS' is directly fitted into the retaining hole Th of the attachment body T.

Figure 7:
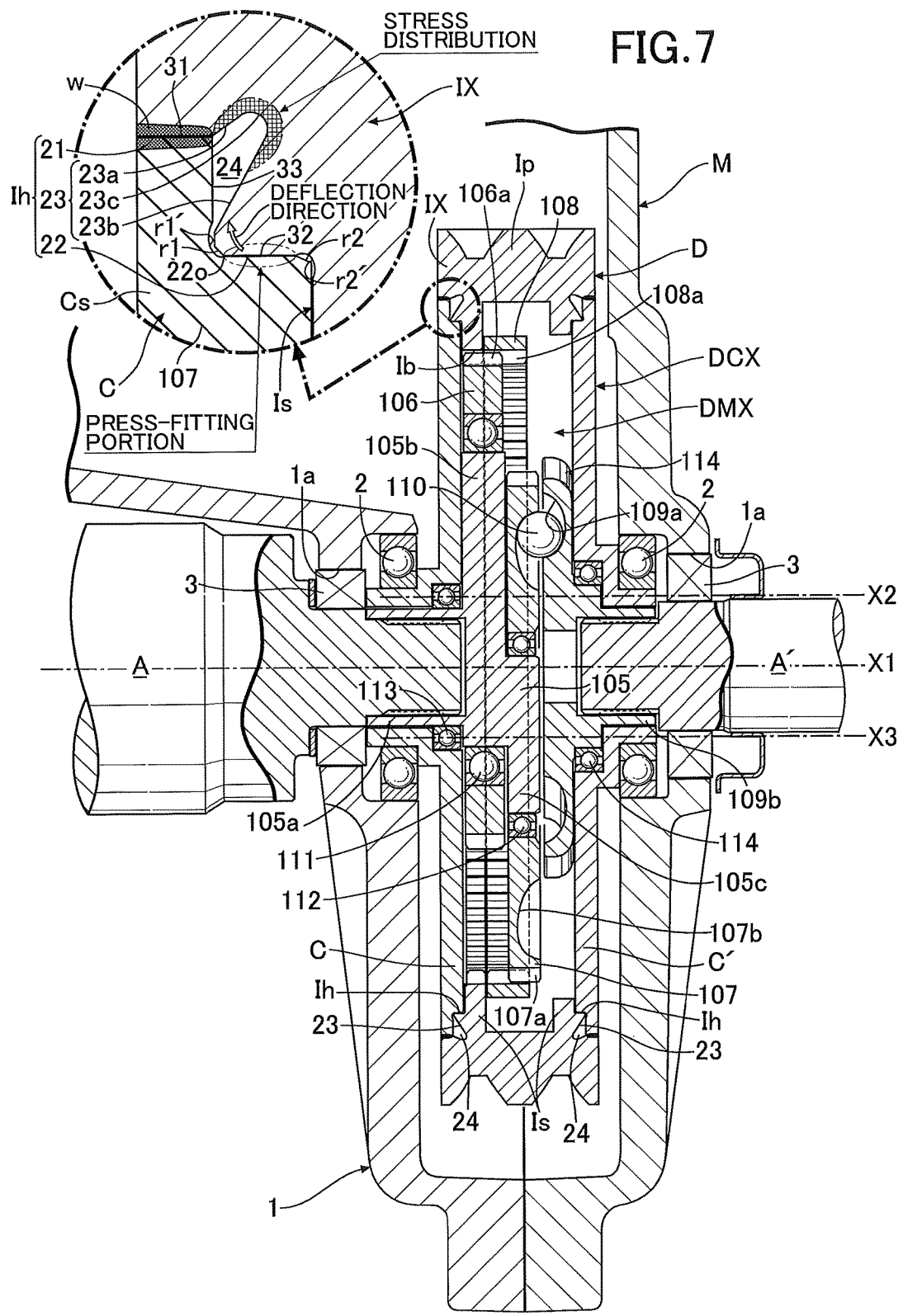
FIG. 7 is a longitudinal sectional view of a differential device according to a third embodiment of the present invention and its vicinity (a view corresponding to FIG. 1).
Figure 8:
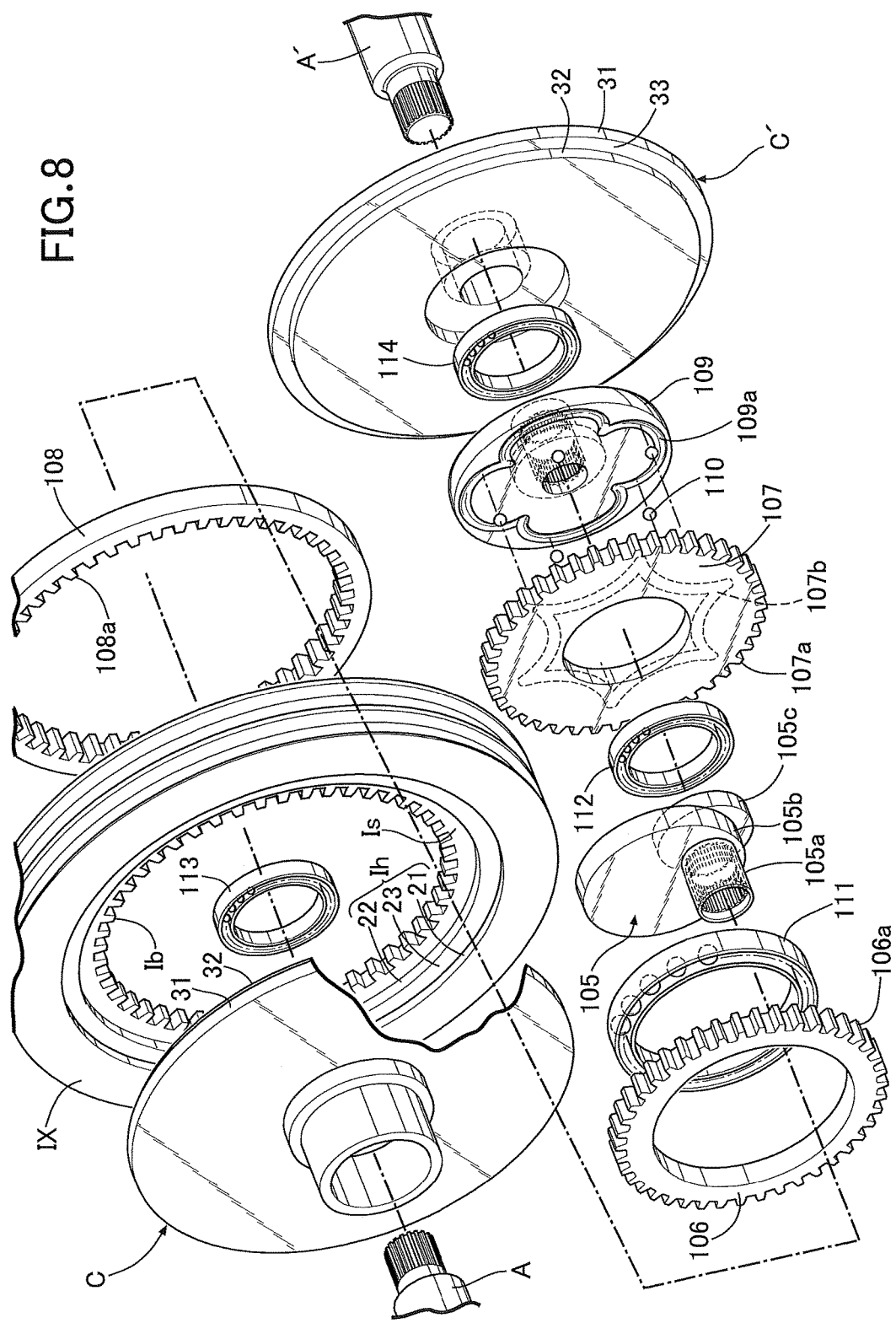
FIG. 8 is an exploded perspective view of the differential device according to the third embodiment of the present invention.

Next, referring to FIGS. 7 and 8, a third embodiment of the present invention will be described. A differential case DCX and a differential mechanism DMX housed inside the differential case DCX of the third embodiment are different in concrete structure and function from the differential case DC and the differential mechanism DM of the first and second embodiments.

Specifically, a differential device D includes: an input member IX (a first rotary member) integrally including in an outer periphery a driven pulley Ip as an input part and formed in a short cylinder shape; the differential mechanism DMX distributively transmitting rotational force, which acts on the input member IX from an engine via the driven pulley Ip, to a pair of left and right output shafts A, A'; and a pair of left and right cover portions C, C' connected to the input member IX, covering opening end portions of both axial ends of the input member IX, respectively, and formed in a disk shape. In addition, the differential case DCX is formed from the input member IX and the cover portions C, C'. The differential mechanism DMX is disposed inside the differential case DCX. A structure for attaching the differential case DCX to a transmission case 1 is the same as that of the first embodiment. Incidentally, in this embodiment, the outer periphery of the input member IX may be provided with the input tooth portion Ig of the first embodiment, instead of the driven pulley Ip as the input part.

Furthermore, a structure for connecting the input member IX and the cover portions C, C' is basically the same as the structure for connecting the input member I and the cover portions C, C' in the first and second embodiments, and the connecting is performed using both welding and press-fitting. For these reasons, components of the concrete structure for connecting the input member IX and the cover portions C, C' will be denoted by the same reference signs as the corresponding components of the first and second embodiments, and further detailed description of the structure will be omitted. Incidentally, in this embodiment, a pair of left and right support wall portions Is, Is are projected from an entire periphery of an inner peripheral portion of the input member IX with a space interposed between the support wall portions Is, Is. Inner side surfaces of the cover portions C, C' are abutted against outer side surfaces of the support wall portions Is, Is, respectively.

Furthermore, the differential mechanism DMX includes: an eccentric shaft 105 including a main shaft portion 105a on a first rotation axis X1, a first eccentric shaft portion 105b on a second rotation axis X2 eccentric from the first rotation axis X1, and a second eccentric shaft portion 105c on a third rotation axis X3 eccentric from the first rotation axis X1 in an opposite direction from the second rotation axis X2, the first and second eccentric shaft portions 105b, 105c being capable of revolving around the first rotation axis X1 with a 180-degree phase shift therebetween; a second rotary member 106 including outer teeth 106a in mesh with inner teeth Ib which are formed in an inner peripheral end of one support wall portion Is of the input member IX, the second rotary member 106 being capable of revolving around the first rotation axis X1 while rotating on the first eccentric shaft portion 105b, and the second rotary member 106 being smaller in diameter than the input member IX; a third rotary member 107 including outer teeth 107a whose module is the same as that of the outer teeth 106a of the second rotary member 106, the third rotary member 107 being disposed adjacent to one side of the second rotary member 106 and capable of revolving around the first rotation axis X1 while rotating on the second eccentric shaft portion 105c; a fourth rotary member 108 rotatable around the first rotation axis X1 and disposed on outer peripheries of the second and third rotary members 106, 107, the fourth rotary member 108 including inner teeth 108a which are formed in its inner periphery to be in mesh with the outer teeth 106a, 107a of the second and third rotary members 106, 107 for the purpose of transmitting the rotation of the second rotary member 106 to the third rotary member 107, and the fourth rotary member 108 being larger in diameter than the second and third rotary members 106, 107; and a fifth rotary member 109 disposed adjacent to one side of the third rotary member 107 and rotating around the first rotation axis X1 by receiving the rotation and the revolution of the third rotary member 107.

Moreover, one output shaft A of the left and right output shafts is spline-connected to the main shaft portion 105a of the eccentric shaft 105, and the other output shaft A' of the left and right output shafts is spline-connected to a shaft portion 109b of the fifth rotary member 109. At this time, the second rotary member 106 is fitted to the first eccentric shaft portion 105b of the eccentric shaft 105 via a first bearing 111, and the third rotary member 107 is fitted to the second eccentric shaft portion 105c of the eccentric shaft 105 via a second bearing 112. In addition, a third bearing 113 is installed between the main shaft portion 105a of the eccentric shaft 105 and one cover portion C, and a fourth bearing 114 is installed between the shaft portion 109b of the fifth rotary member 109 and the other cover portion C'.

Meanwhile, in this embodiment, the third rotary member 107 and the fifth rotary member 109 are in mesh with each other via five balls 110, the five balls 110 being clamped between a trochoid groove 107b of the third rotary member 107 formed in a shape having six waves and a trochoid groove 109a of the fifth rotary member 109 formed in a shape having four waves, the trochoid groove 107b and the trochoid groove 109a being formed respectively in mutually facing surfaces of the third rotary member 107 and the fifth rotary member 109.

Next, descriptions will be provided for an operation of the differential mechanism DMX of the differential device D of the third embodiment. For example, when temporarily fixing the input member I (the first rotary member) and rotating the one output shaft A, the main shaft portion 105a of the eccentric shaft 105 rotates and the second rotary member 106 in mesh with the inner teeth Ib of the input member I revolves around the first rotation axis X1 while rotating on the first eccentric shaft portion 105b. Meanwhile, the eccentric shaft 105 makes the second rotary member 106 and the third rotary member 107 revolve with the 180-degree phase shift therebetween, and the rotation of the second rotary member 106 is transmitted to the third rotary member 107 via the fourth rotary member 108. For these reasons, the revolution and the rotation of the second rotary member 106 is transmitted to the third rotary member 107 only by the 180-degree phase shift between the second rotary member 106 and the third rotary member 107 in their revolution. Thereafter, the revolution and the rotation of the third rotary member 107 is transmitted to the fifth rotary member 109 which is in mesh with the third rotary member 107 and rotatable around the first rotation axis X1. Thereby, the other output shaft A' connected to the fifth rotary shaft portion 109 rotates at the number of rotation which is different from that of the one output shaft A. In this respect, when the radius of a pitch circle of each of the rotary members inside the differential device D is appropriately determined, where the pitch circle denotes an equivalent pitch circle of the meshing portion of the rotary member, it is possible that the number of rotation of the other output shaft A' is −k when the number of rotation of the one output shaft A is k. Thereby, when the input member I is rotated n times in this state, the one output shaft A rotates n+k times and the other output shaft A' rotates n−k times, thereby it is to enable differential rotation. For this reason, the differential mechanism DMX is capable of making the differential device D function effectively.

Meanwhile, in the conventional differential devices exemplified in Japanese Patent No. 4803871 and Japanese Patent Application KOKAI Publication No. 2002-364728 (particularly, the conventional differential devices each including inside the input member the pinion (the differential gear) and the pair of side gears (output gears) in mesh with the pinion (the differential gear)), the number Z1 of teeth of the side gear (output gear) and the number Z2 of teeth of the pinion (differential gear) are generally set at 14 and 10, 16 and 10, or 13 and 9, respectively, as shown in Japanese Patent Application KOKAI Publication No. 2002-364728, for example. In these cases, the number-of-teeth ratios Z1/Z2 of the output gears to the differential gears are 1.4, 1.6 and 1.44, respectively. In addition, other publicly-known examples of the combination of the number Z1 of teeth and the number Z2 of teeth for conventional differential devices include 15 and 10, 17 and 10, 18 and 10, 19 and 10, and 20 and 10. In these cases, the number-of-teeth ratios Z1/Z2 are at 1.5, 1.7, 1.8, 1.9 and 2.0, respectively.

On the other hand, nowadays, there is an increase in the number of transmission systems which are under layout restrictions around their respective differential devices. Accordingly, the market demands that differential devices be sufficiently reduced in width (i.e., thinned) in the axial direction of their output shafts while securing the gear strength for the differential devices. However, the structural forms of the conventional existing differential devices are wide in the axial direction of the output shafts, as apparent from the gear combinations leading to the above-mentioned number-of-teeth ratios. This makes it difficult to satisfy the market demand.

With this taken into consideration, an attempt to find a concrete configuration example of the differential device D which can be sufficiently reduced in width (i.e., thinned) in the axial direction of the output shafts while securing the gear strength for the differential device has been made as follows, from a viewpoint different from that of the foregoing embodiment. Incidentally, the structures of the components of the differential device D of this configuration example are the same as the structures of the components of the differential device D of the foregoing embodiments which has been described using FIGS. 1 to 8 (especially, FIGS. 1 to 5). For this reason, the components of the configuration example will be denoted with the same reference signs as those of the embodiments, and descriptions for the structures will be omitted.

Figure 9:
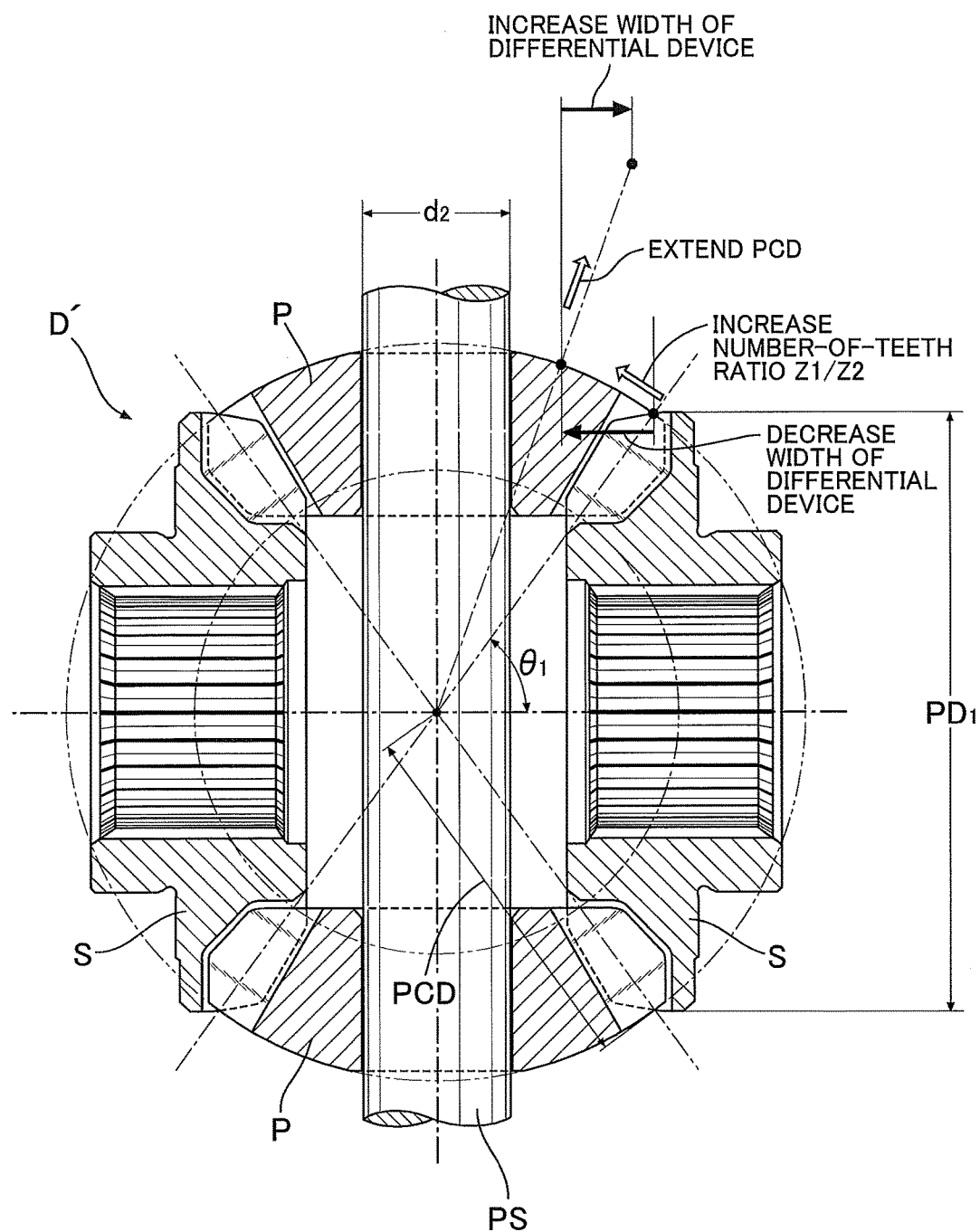
FIG. 9 is a longitudinal sectional view showing an example of a conventional differential device.

To begin with, let us explain a basic concept for sufficiently reducing the width of (i.e., thinning) the differential device D in the axial direction of the output shafts A referring to FIG. 9 together. The concept is as follows. Approach [1] To make the number-of-teeth ratio Z1/Z2 of the side gear S, that is, the output gear to the pinion P, that is, the differential gear larger than the number-of-teeth ratio used for the conventional existing differential device. (This leads to a decrease in the module (accordingly the tooth thickness) of the gear and a resultant decrease in the gear strength, while leading to an increase in the pitch circle diameter of the side gear S, a resultant decrease in transmission load in the meshing portion of the gear, and a resultant increase in the gear strength. However, the gear strength as a whole decreases, as discussed below.)

Approach [2] To make the pitch cone distance PCD of the pinion P larger than the pitch cone distance in the conventional existing differential device. (This leads to an increase in the module of the gear and a resultant increase in the gear strength, while leading to an increase in the pitch circle diameter of the side gear S, a resultant decrease in the transmission load in the meshing portion of the gear, and a resultant increase in the gear strength. Thus, the gear strength as a whole increases greatly, as discussed below.)

For these reasons, when the number-of-teeth ratio Z1/Z2 and the pitch cone distance PCD are set such that the amount of decrease in the gear strength based on Approach [1] is equal to the amount of increase in the gear strength based on Approach [2] or such that the amount of increase in the gear strength based on Approach [2] is greater than the amount of decrease in the gear strength based on Approach [1], the gear strength as a whole can be made equal to or greater than that of the conventional existing differential device.

Next, let us concretely examine how the gear strength changes based on Approaches [1] and [2] using mathematical expressions. Incidentally, the examination will be described in the following embodiment. First of all, a "reference differential device" is defined as a differential device D' in which the number Z1 of teeth of the side gear S is set at 14 while the number Z2 of teeth of the pinion P is set at 10. In addition, for each variable, a "change rate" is defined as a rate of change in the variable in comparison with the corresponding base number (i.e., 100%) of the reference differential device D'.

Approach [1]

When M, $PD_1$, $\theta_1$, PCD, F, and T respectively denote the module, pitch circle diameter, pitch angle, pitch cone distance, transmission load in the gear meshing portion, and transmission torque in the gear meshing portion, of the side gear S, general formulae concerning the bevel gear provide $M = PD_1/Z1$, $PD_1 = 2PCD \cdot \sin \theta_1$, and $\theta_1 = \tan^{-1}(Z1/Z2)$.

From these expressions, the module of the gear is expressed with $$M = 2PCD \cdot \sin \{\tan^{-1}(Z1/Z2)\}/Z1 \quad (1)$$

Meanwhile, the module of the reference differential device D' is expressed with $$2PCD \cdot \sin \{\tan^{-1}(7/5)\}/14.$$

Dividing the term on the right side of Expression (1) by $2PCD \cdot \sin \{\tan^{-1}(7/5)\}/14$ yields a module change rate with respect to the reference differential device D', which is expressed with Expression (2) given below.

$$\text{Module Change Rate} = \frac{14 \cdot \sin\left(\tan^{-1}\frac{z1}{z2}\right)}{z1 \cdot \sin\left(\tan^{-1}\frac{7}{5}\right)} \quad (2)$$

In addition, the section modulus of the tooth portion corresponding to the gear strength (i.e., the bending strength of the tooth portion) is in proportion to the square of the tooth thickness, while the tooth thickness has a substantially linear relationship with the module M. For these reasons, the square of the module change rate corresponds to a rate of change in the section modulus of the tooth portion, accordingly a gear strength change rate. In other words, based on Expression (2) given above, the gear strength change rate is expressed with Expression (3) given below. Expression (3) is represented by a line L1 in FIG. 10 when the number Z2 of teeth of the pinion P is 10. From the line L1, it is learned that as the number-of-teeth ratio Z1/Z2 becomes larger, the module becomes smaller and the gear strength accordingly becomes lower.

$$\text{Gear Strength Change Rate} = (\text{Module Change Rate})^2 \quad (3)$$

$$= \frac{196 \cdot \sin^2\left(\tan^{-1}\frac{z1}{z2}\right)}{z1^2 \cdot \sin^2\left(\tan^{-1}\frac{7}{5}\right)}$$

Meanwhile, based on the general formulae concerning the bevel gear, a torque transmission distance of the side gear S is expressed with Expression (4) given below.

$$PD_1/2 = PCD \cdot \sin \{\tan^{-1}(Z1/Z2)\} \quad (4)$$

From the torque transmission distance $PD_1/2$, the transmission load F is given as $$F = 2T/PD_1.$$

For this reason, when the torque T of the side gear S of the reference differential device D' is constant, the transmission load F is in inverse proportion to the pitch circle diameter $PD_1$. In addition, the rate of change in the transmission load F is in inverse proportion to the gear strength change rate. For this reason, the gear strength change rate is equal to the rate of change in the pitch circle diameter $PD_1$.

As a result, using Expression (4), the rate of change in the pitch circle diameter $PD_1$ is expressed with Expression (5) given below.

Gear Strength Change Rate = $PD_1$ Change Rate (5)

$$= \frac{\sin\left(\tan^{-1}\frac{z1}{z2}\right)}{\sin\left(\tan^{-1}\frac{7}{5}\right)}$$

Figure 10:
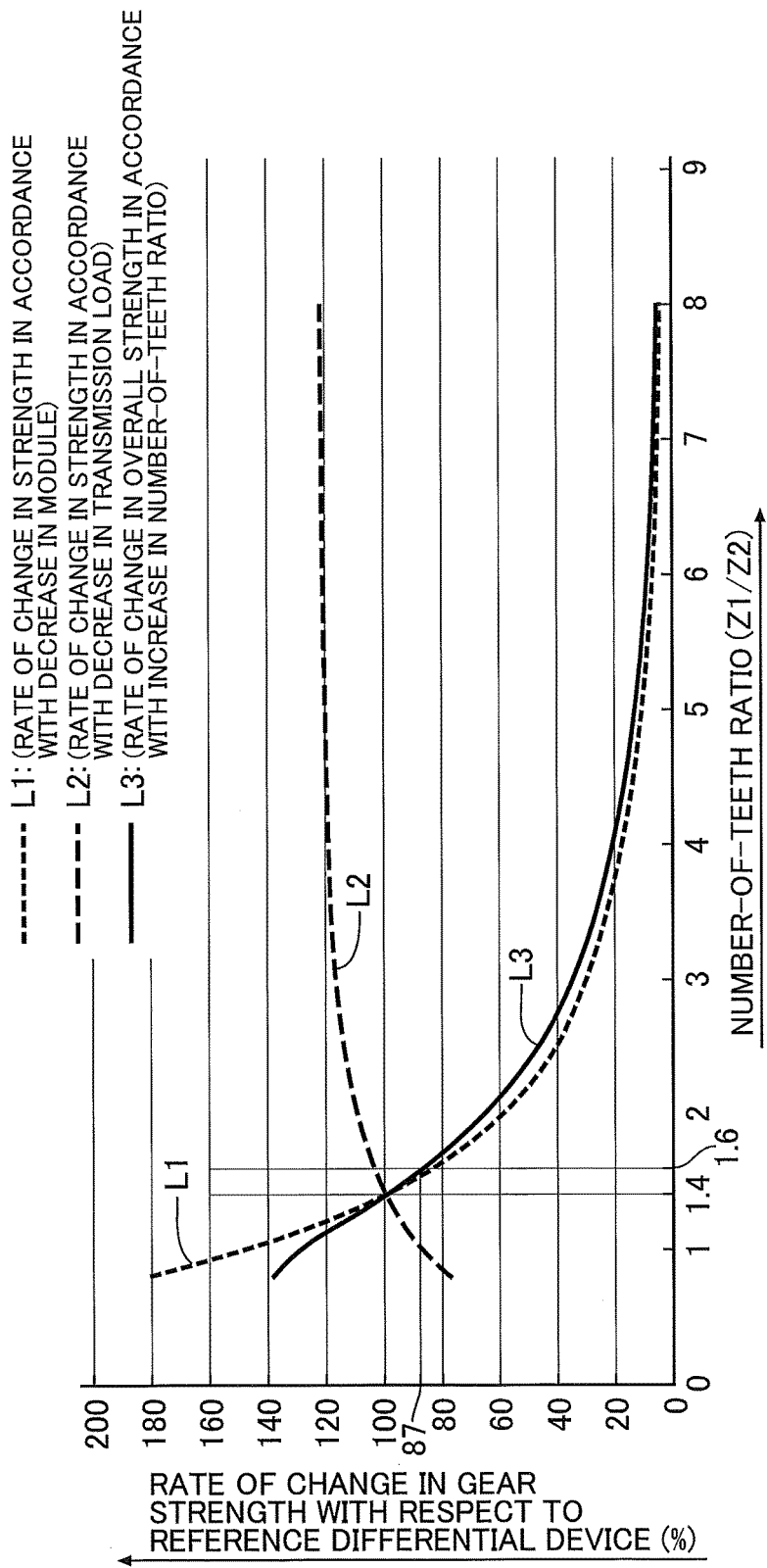
FIG. 10 is a graph showing a relationship of gear strength change rates with a number-of-teeth ratio where the number of teeth of the pinion is set at 10.

Expression (5) is represented by a line L2 in FIG. 10 when the number Z2 of teeth of the pinion P is 10. From the line L2, it is learned that as the number-of-teeth ratio Z1/Z2 becomes larger, the transmission load becomes smaller, and the gear strength accordingly becomes stronger.

Eventually, the gear strength change rate in accordance with the increase in the number-of-teeth ratio Z1/Z2 is expressed with Expression (6) given below by multiplying a rate of decrease change in the gear strength in accordance with the decrease in the module M (the term on the right side of Expression (3) shown above) and a rate of increase change in the gear strength in accordance with the decrease in the transmission load (the term on the right side of Expression (5) shown above).

$$\text{Gear Strength Change Rate in Accordance with Number-of-Teeth Ratio} = \frac{196 \cdot \sin^3\left(\tan^{-1}\frac{z1}{z2}\right)}{z1^2 \cdot \sin^3\left(\tan^{-1}\frac{7}{5}\right)} \quad (6)$$

Expression (6) is represented by a line L3 in FIG. 10 when the number Z2 of teeth of the pinion P is 10. From the line L3, it is learned that as the number-of-teeth ratio Z1/Z2 becomes larger, the gear strength as a whole becomes lower.

Approach [2]

In a case of increasing the pitch cone distance PCD of the pinion P more than the pitch cone distance in the reference differential device D', when PCD1, PCD2 respectively denote the pitch cone distance PCD before the change and the pitch cone distance PCD after the change, the module change rate in accordance with the change in the pitch cone distance PCD is expressed with $PCD2/PCD1$ if the number of teeth is constant, based on the above-mentioned general formulae concerning the bevel gear.

Meanwhile, as being clear from the above-discussed process for deriving Expression (3), the gear strength change rate of the side gear S corresponds to the square of the module change rate. For this reason, Gear Strength Change Rage in Accordance with Increase in Module=$(PCD2/PCD1)^2$ (7)

is obtained. Expression (7) is represented by a line L4 in FIG. 11. From the line L4, it is learned that as the pitch cone distance PCD becomes larger, the module becomes larger, and the gear strength accordingly becomes stronger.

In addition, when the pitch cone distance PCD is made larger than the pitch cone distance PCD1 in the reference differential device D', the transmission load F decreases. Thereby, the gear strength change rate becomes equal to the rate of change in the pitch circle diameter $PD_1$, as described above. In addition, the pitch circle diameter $PD_1$ of the side gear S is in proportion to the pitch cone distance PCD. For these reasons, Gear Strength Change Rate in Accordance with Decrease in Transmission Load=$PCD2/PCD1$ (8)

is obtained.

Figure 11:
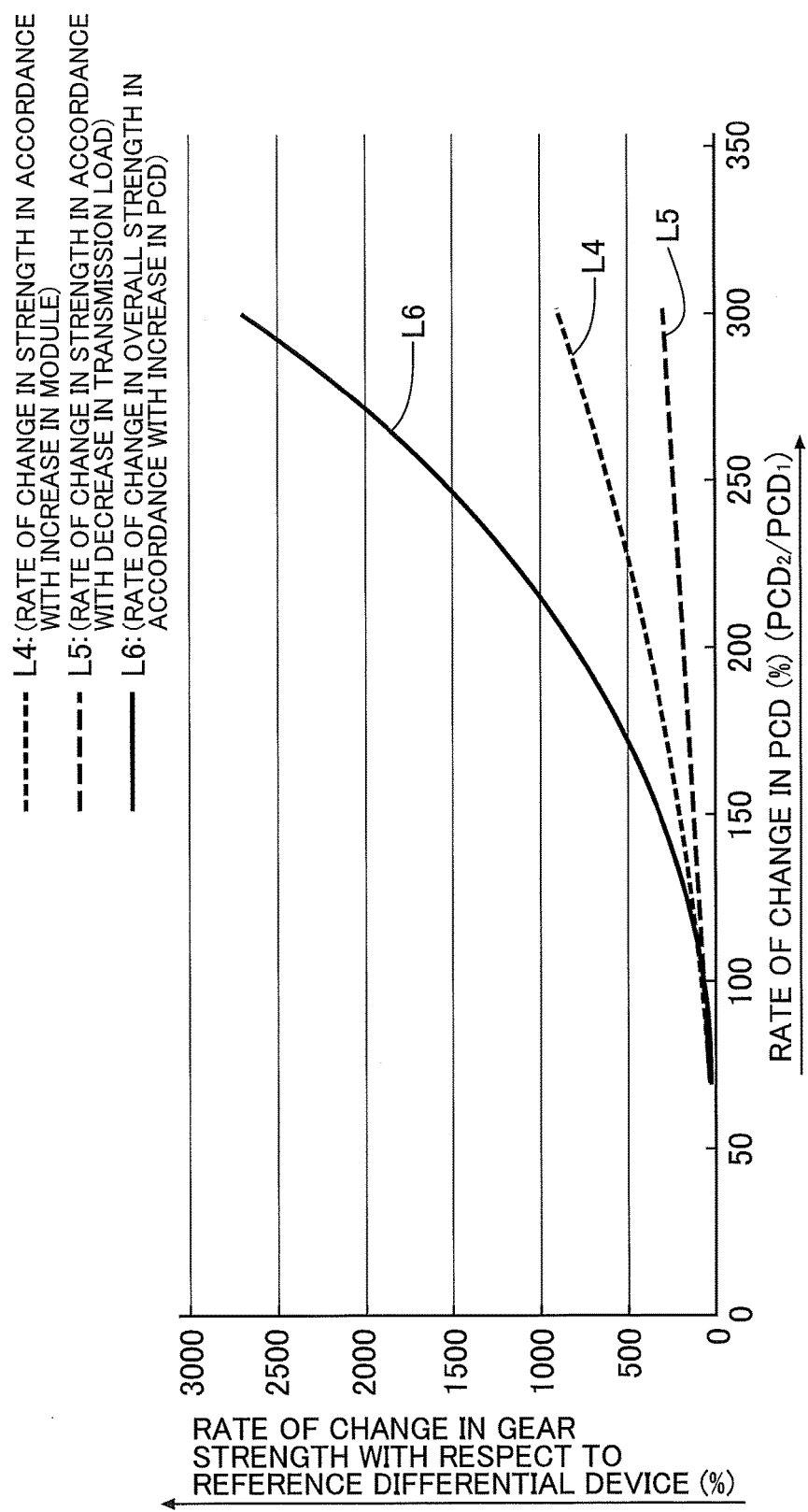
FIG. 11 is a graph showing a relationship of the gear strength change rates with a pitch cone distance change rate.

Expression (8) is represented by a line L5 in FIG. 11. From the line L5, it is learned that as the pitch cone distance PCD becomes larger, the transmission load becomes lower, and the gear strength accordingly becomes stronger.

In addition, the gear strength change rate in accordance with the increase in the pitch cone distance PCD is expressed with Expression (9) given below by multiplying the rate of increase change in the gear strength in accordance with the increase in the module M (the term on the right side of Expression (7) shown above) and the rate of increase change in the gear strength in accordance with the decrease in the transmission load in response to the increase in the pitch circle diameter PD (the term on the right side of Expression (8) shown above).

Gear Strength Change Rate in Accordance with Increase in Pitch Cone Distance=$(PCD2/PCD1)^3$ (9)

Expression (9) is represented by a line L6 in FIG. 11. From the line L6, it is learned that as the pitch cone distance PCD becomes larger, the gear strength is increased greatly.

With these taken into consideration, the combination of the number-of-teeth ratio Z1/Z2 and the pitch cone distance PCD is determined such that: the decrease in the gear strength based on Approach [1] given above (the increase in the number-of-teeth ratio) is sufficiently compensated for by the increase in the gear strength based on Approach [2] given above (the increase in the pitch cone distance) so as to make the overall gear strength of the differential device equal to or greater than the gear strength of the conventional existing differential device.

For example, 100% of the gear strength of the side gear S of the reference differential device D' can be kept by setting the gear strength change rate in accordance with the increase in the number-of-teeth ratio (i.e., the term on the right side of Expression (6) given above) obtained based on Approach [1] given above and the gear strength change rate in accordance with the increase in the pitch cone distance (i.e., the term on the right side of Expression (9) given above) obtained based on Approach [2] given above, such that the multiplication of these gear strength change rates becomes equal to 100%. Thereby, the relationship between the number-of-teeth ratio Z1/Z2 and the rate of change in the pitch cone distance PCD for keeping 100% of the gear strength of the reference differential device D' can be obtained from Expression (10) given below. Expression (10) is represented by a line L7 in FIG. 12 when the number Z2 of teeth of the pinion P is 10.

$$PCD2/PCD1 = \left(100\% \bigg/ \begin{array}{c}\text{Gear Strength Change}\\\text{Rate in Accordance with}\\\text{Number-of-Teeth Ratio}\end{array}\right)^{\frac{1}{3}} \quad (10)$$

$$= \left\{\frac{1}{\dfrac{196 \cdot \sin^3\left(\tan^{-1}\dfrac{z1}{z2}\right)}{z1^2 \cdot \sin^3\left(\tan^{-1}\dfrac{7}{5}\right)}}\right\}^{\frac{1}{3}}$$

$$= \left(\frac{z1}{14}\right)^{\frac{2}{3}} \cdot \frac{\sin\left(\tan^{-1}\frac{7}{5}\right)}{\sin\left(\tan^{-1}\frac{z1}{z2}\right)}$$

Figure 12:
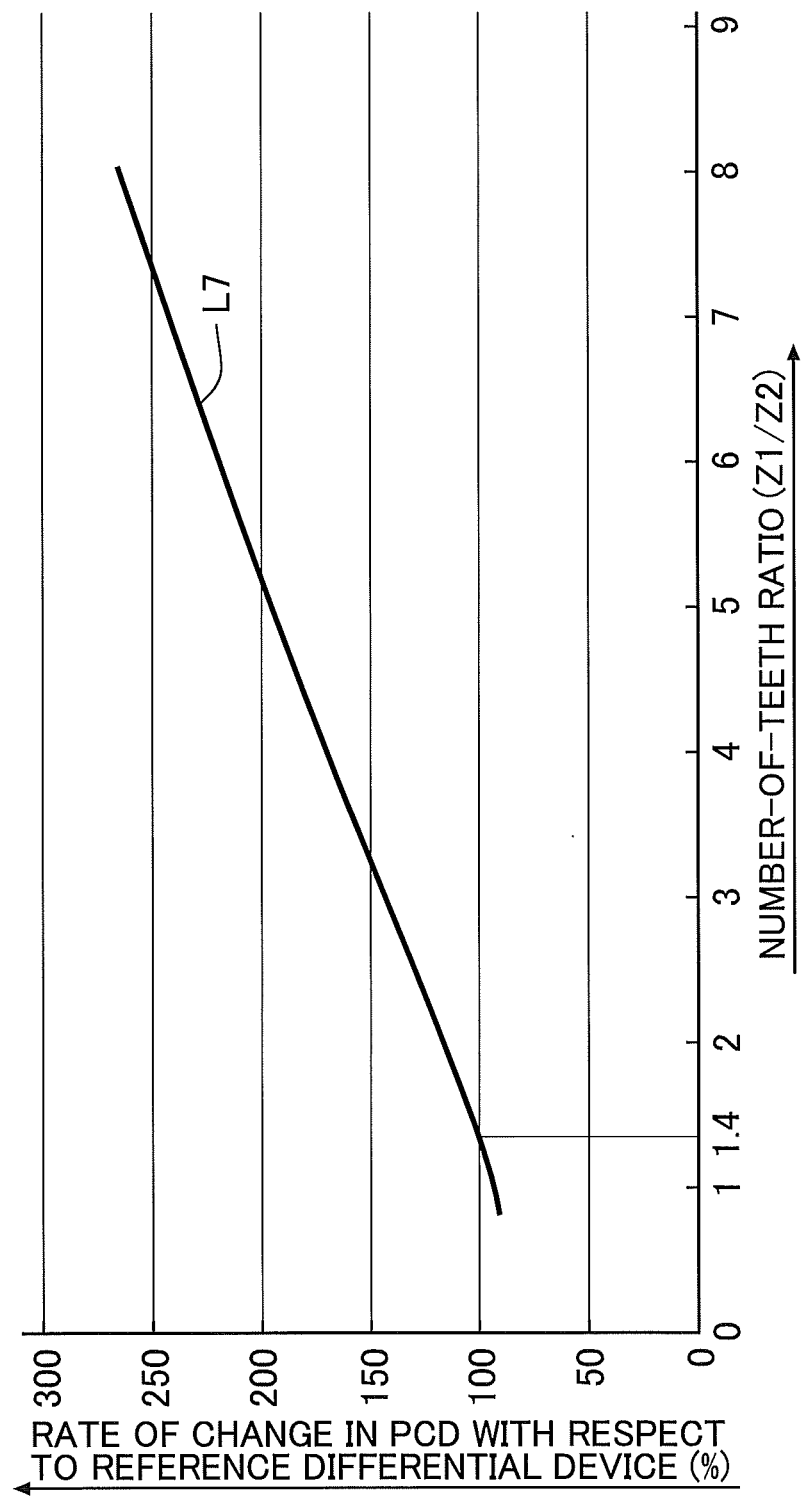
FIG. 12 is a graph showing a relationship of the pitch cone distance change rate with the number-of-teeth ratio for keeping 100% of the gear strength where the number of teeth of the pinion is set at 10.

Like this, Expression (10) represents the relationship between the number-of-teeth ratio Z1/Z2 and the rate of change in the pitch cone distance PCD for keeping 100% of the gear strength of the reference differential device D' when the number-of-teeth ratio Z1/Z2 is equal to 14/10 (see FIG. 12). The rate of change in the pitch cone distance PCD represented by the vertical axis in FIG. 12 can be converted into a ratio of d2/PCD where d2 denotes a shaft diameter of the pinion shaft PS (i.e., the pinion support portion) supporting the pinion P.

TABLE 1

| PCD | SHAFT DIAMETER (d2) | d2/PCD |
|---|---|---|
| 31 | 13 | 42% |
| 35 | 15 | 43% |
| 38 | 17 | 45% |
| 39 | 17 | 44% |
| 41 | 18 | 44% |
| 45 | 18 | 40% |

To put it concretely, in the conventional existing differential device, the increase change in the pitch cone distance PCD correlates with the increase change in the shaft diameter d2 as shown in Table 1, and can be represented by a decrease in the ratio of d2/PCD when d2 is constant. In addition, in the conventional existing differential device, d2/PCD falls within a range of 40% to 45% as shown in Table 1 given above when the conventional existing differential device is the reference differential device D', and the gear strength increases as the pitch cone distance PCD increases. Judging from these, the gear strength of the differential device can be made equal to or greater than the gear strength of the conventional existing differential device by determining the shaft diameter d2 of the pinion shaft PS and the pitch cone distance PCD such that at least d2/PCD is equal to or less than 45%, when the differential device is the reference differential device D'. In other words, when the differential device is the reference differential device D', it suffices if d2/PCD≤0.45 is satisfied. In this case, when PCD2 denotes the pitch cone distance PCD which is changed to become larger or less than the pitch cone distance PCD1 of the reference differential device D', it suffices if $$d2/PCD2 \le 0.45/(PCD2/PCD1) \quad (11)$$

is satisfied. Furthermore, the application of Expression (11) to Expression (10) given above can convert the relationship between d2/PCD and the number-of-teeth ratio Z1/Z2 into Expression (12) given below.

$$d2/PCD \le 0.45/(PCD2/PCD1) \quad (12)$$

$$= 0.45 \Big/ \left\{ \left(\frac{z1}{14}\right)^{\frac{2}{3}} \cdot \frac{\sin\left(\tan^{-1}\frac{7}{5}\right)}{\sin\left(\tan^{-1}\frac{z1}{z2}\right)} \right\}$$

$$= 0.45 \cdot \left(\frac{14}{z1}\right)^{\frac{2}{3}} \cdot \frac{\sin\left(\tan^{-1}\frac{z1}{z2}\right)}{\sin\left(\tan^{-1}\frac{7}{5}\right)}$$

Figure 13:
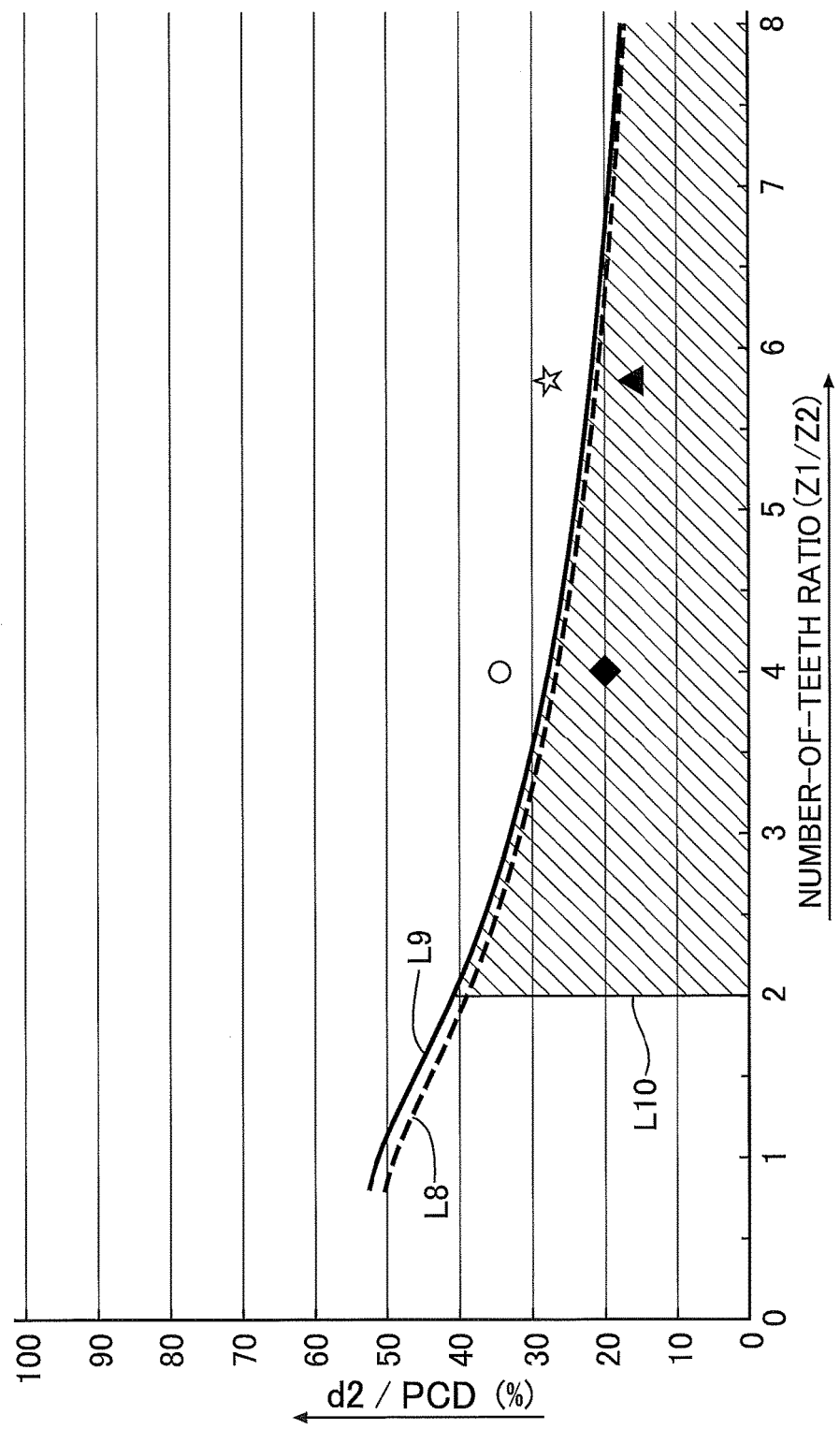
FIG. 13 is a graph showing a relationship between a shaft diameter/pitch cone distance ratio and the number-of-teeth ratio where the number of teeth of the pinion is set at 10.

When the Expression (12) is equal, Expression (12) can be represented by a line L8 in FIG. 13 if the number Z2 of teeth of the pinion P is 10. When the Expression (12) is equal, the relationship between d2/PCD and the number-of-teeth ratio Z1/Z2 keeps 100% of the gear strength of the reference differential device D'.

Meanwhile, in conventional existing differential devices, usually, not only the number-of-teeth ratio Z1/Z2 equal to 1.4 used above to explain the reference differential device D' but also the number-of-teeth ratio Z1/Z2 equal to 1.6 or 1.44 is adopted. This needs to be taken into consideration. Based on the assumption that the reference differential device D' (Z1/Z2=1.4) guarantee the necessary and sufficient gear strength, that is, 100% of gear strength, it is learned, as being clear from FIG. 10, that the gear strength of conventional existing differential devices in which the number-of-teeth ratio Z1/Z2 is 16/10 is as low as 87% of the gear strength of the reference differential device D'. The general practice, however, is that the gear strength low at that level is accepted as practical strength and actually used for conventional existing differential devices. Judging from this, one may consider that gear strength which needs to be sufficiently secured for and is acceptable for the differential device which is thinned in the axial direction is at least equal to, or greater than, 87% of the gear strength of the reference differential device D'.

From the above viewpoint, first, a relationship for keeping 87% of the gear strength of the reference differential device D' is obtained between the number-of-teeth ratio Z1/Z2 and the rate of change in the pitch cone distance PCD. The relationship can be expressed with Expression (10') given below by performing a calculation by emulating the process of deriving Expression (10) given above (i.e., a calculation such that the multiplication of the gear strength change rate in accordance with the increase in the number-of-teeth ratio (i.e., the term on the right side of Expression (6) given above) and the gear strength change rate in accordance with the increase in the pitch cone distance (i.e., the term on the right side of Expression (9) given above) becomes equal to 87%).

$$PCD2/PCD1 = \left(87\% \Big/ \begin{array}{c}\text{Gear Strength Change}\\ \text{Rate in Accordance with}\\ \text{Number-of-Teeth Ratio}\end{array}\right)^{\frac{1}{3}} \quad (10')$$

$$= \left\{\frac{1}{\left[\frac{196 \cdot \sin^3\left(\tan^{-1}\frac{z1}{z2}\right)}{z1^2 \cdot \sin^3\left(\tan^{-1}\frac{7}{5}\right)}\right]}\right\}^{\frac{1}{3}}$$

$$= 0.87^{\frac{1}{3}} \cdot \left(\frac{z1}{14}\right)^{\frac{2}{3}} \cdot \frac{\sin\left(\tan^{-1}\frac{7}{5}\right)}{\sin\left(\tan^{-1}\frac{z1}{z2}\right)}$$

Thereafter, when Expression (11) given above is applied to Expression (10') given above, the relationship between d2/PCD and the number-of-teeth ratio Z1/Z2 for keeping 87% or more of the gear strength of the reference differential device D' can be converted into Expression (13) given below. However, the calculation is performed using the following rules that: the number of significant figures is three for all the factors, except for factors expressed with variables; digits below the third significant figure are rounded down; and although the result of the calculation cannot avoid approximation by an calculation error, the mathematical expression uses the equals sign because the error is negligible.

$$d2/PCD \leq 0.45 \Bigg/ \left\{ 0.87^{\frac{1}{3}} \cdot \left(\frac{z1}{14}\right)^{\frac{2}{3}} \cdot \frac{\sin\left(\tan^{-1}\frac{7}{5}\right)}{\sin\left(\tan^{-1}\frac{z1}{z2}\right)} \right\} \quad (13)$$

$$= 3.36 \cdot \left(\frac{1}{z1}\right)^{\frac{2}{3}} \cdot \sin\left(\tan^{-1}\frac{z1}{z2}\right)$$

When the Expression (13) is equal, Expression (13) can be represented by FIG. 13 (more specifically, by a line L9 in FIG. 13) if the number Z2 of teeth of the pinion P is 10. In this case, an area corresponding to Expression (13) is an area on and under the line L9 in FIG. 13. In addition, a specific area (a hatched area in FIG. 13) satisfying Expression (13) and located on the right side of a line L10 in FIG. 13 where the number-of-teeth ratio Z1/Z2>2.0 is satisfied is an area for setting Z1/Z2 and d2/PCD which enable at least 87% or more of the gear strength of the reference differential device D' to be secured particularly for the differential device thinned in the axial direction where the number Z2 of teeth of the pinion P is 10 and the number-of-teeth ratio Z1/Z2 is greater than 2.0. For reference, a black diamond in FIG. 13 represents an example where the number-of-teeth ratio Z1/Z2 and d2/PCD are set at 40/10 and 20.00%, respectively, and a black triangle in FIG. 13 represents an example where the number-of-teeth ratio Z1/Z2 and d2/PCD are set at 58/10 and 16.67%, respectively. These examples fall within the specific area. A result of a simulation for strength analysis on these examples has confirmed that the gear strength equal to or greater than those of the conventional differential devices (more specifically, the gear strength equal to or greater than 87% of the gear strength of the reference differential device D') were obtained.

Thus, the thinned differential device falling within the specific area is configured as the differential device which, as a whole, is sufficiently reduced in width in the axial direction of the output shafts while securing the gear strength (for example, static torsion load strength) and the maximum amount of torque transmission at approximately the same levels as the conventional existing differential devices which are not thinned in the axial direction thereof. Accordingly, it is possible to achieve effects of: being capable of easily incorporating the differential device in a transmission system, which is under many layout restrictions around the differential device, with great freedom and no specific difficulties; being extremely advantageous in reducing the size of the transmission system; and the like.

Moreover, when the thinned differential device in the specific area has, for example, the structure of the above-mentioned embodiment (more specifically, the structures shown in FIGS. 1 to 8), the thinned differential device in the specific area can obtain an effect derived from the structure shown in the embodiment.

Figure 14:
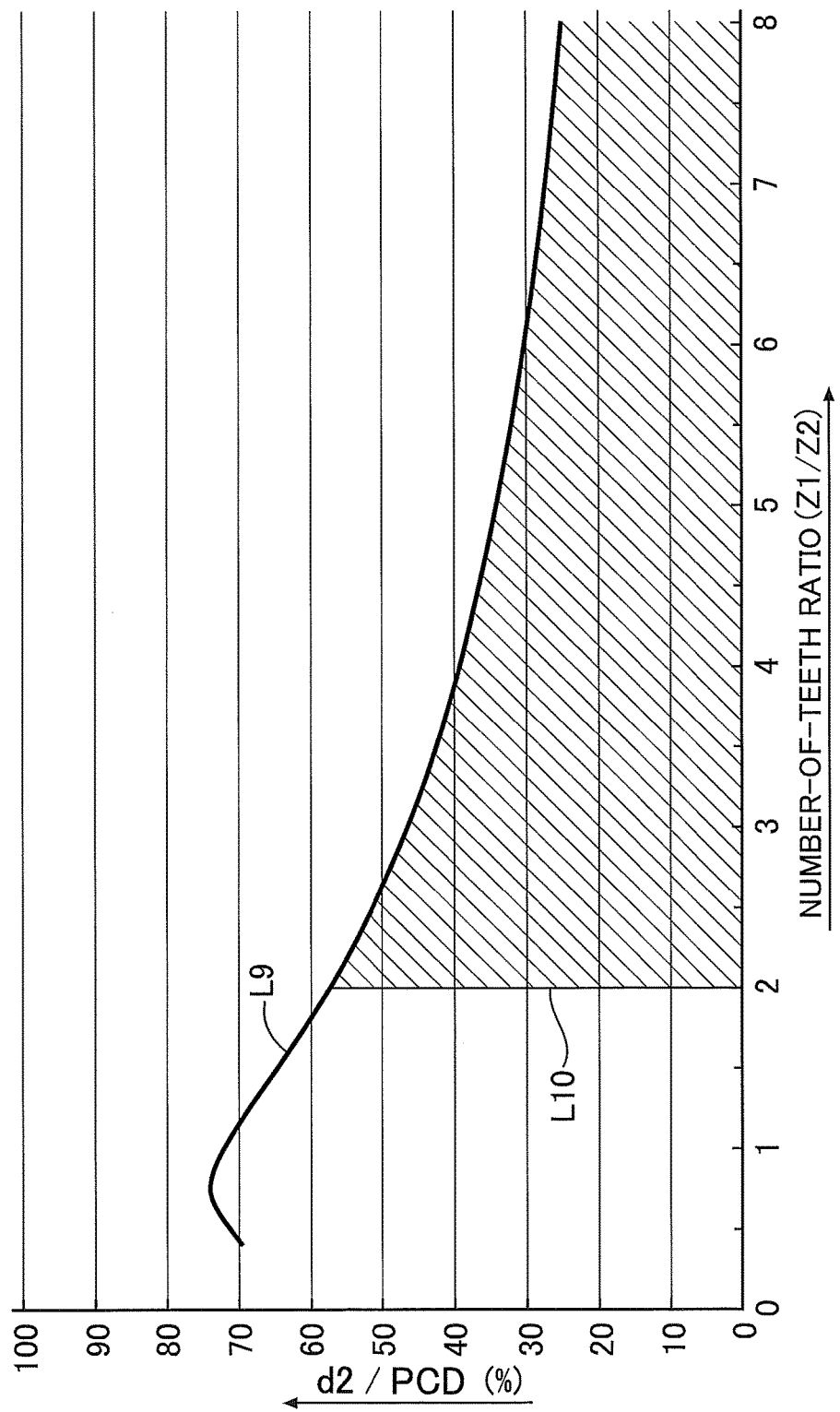
FIG. 14 is a graph showing a relationship between the shaft diameter/pitch cone distance ratio and the number-of-teeth ratio where the number of teeth of the pinion is set at 6.

It should be noted that although the foregoing descriptions (the descriptions in connection with FIGS. 10, 12, 13 in particular) have been provided for the differential device in which the number Z2 of teeth of the pinion P is set at 10, the present invention is not limited to this. For example, when the number Z2 of teeth of the pinion P is set at 6, 12 and 20, too, the thinned differential device capable of achieving the above effects can be represented by Expression (13), as shown by hatched areas in FIGS. 14, 15 and 16. In other words, Expression (13) derived in the above-described manner is applicable regardless of the change in the number Z2 of teeth of the pinion P. For example, even when the number Z2 of teeth of the pinion P is set at 6, 12 and 20, the above effects can be obtained by setting the number Z1 of teeth of the side gear S, the number Z2 of teeth of the pinion P, the shaft diameter d2 of the pinion shaft PS and the pitch cone distance PCD such that Expression (13) is satisfied, like in the case where the number Z2 of teeth of the pinion P is set at 10.

Figure 15:
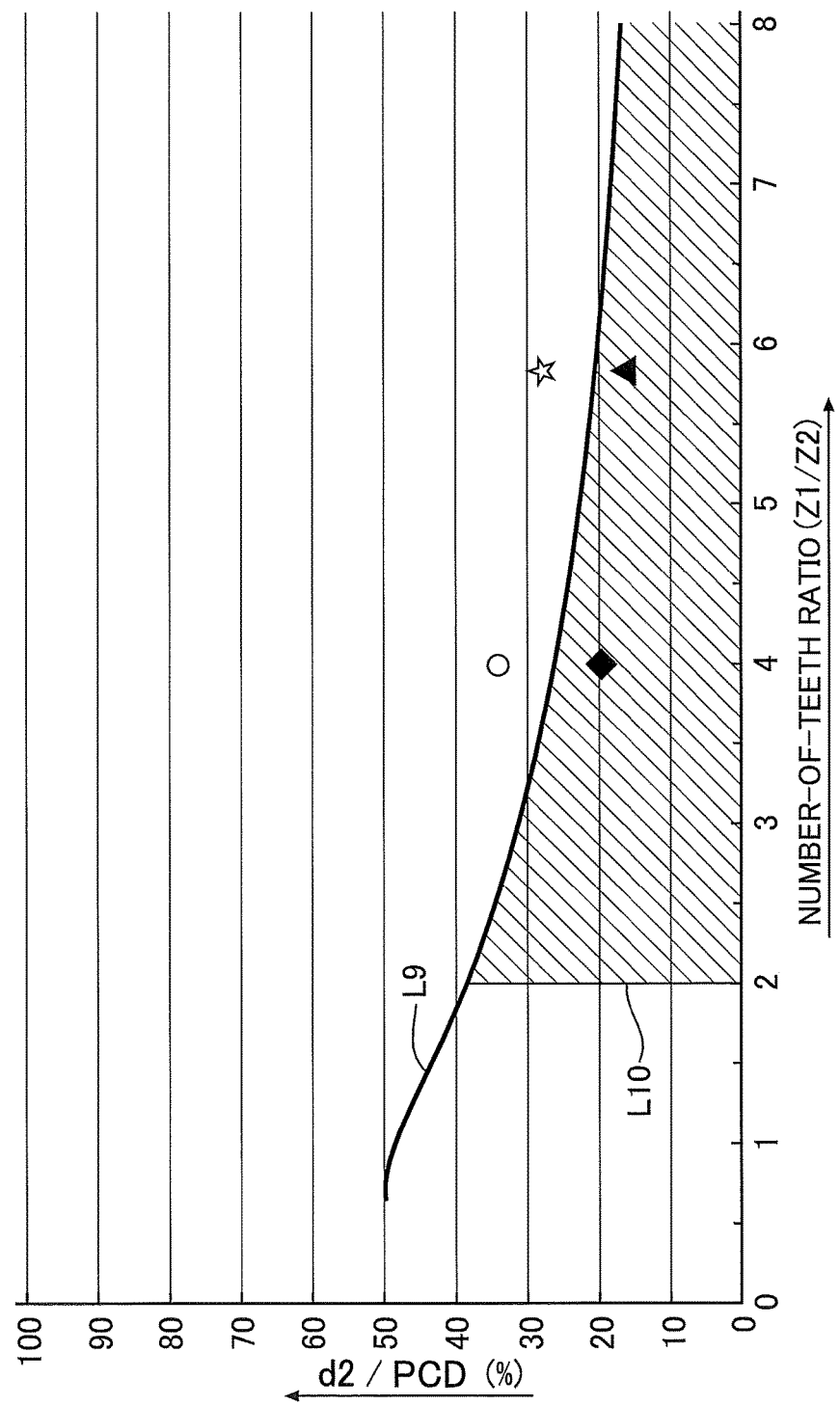
FIG. 15 is a graph showing a relationship between the shaft diameter/pitch cone distance ratio and the number-of-teeth ratio where the number of teeth of the pinion is set at 12.
Figure 16:
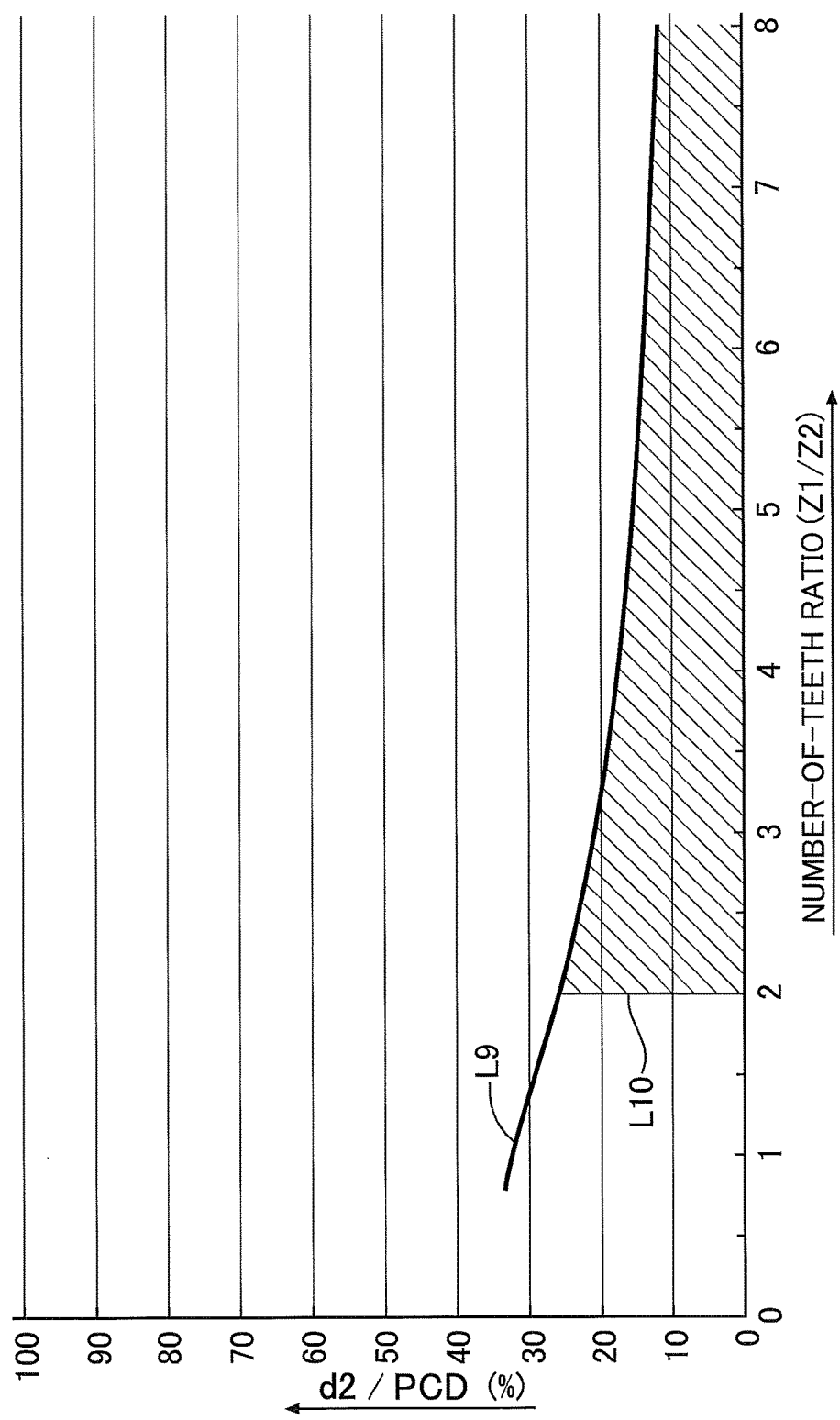
FIG. 16 is a graph showing a relationship between the shaft diameter/pitch cone distance ratio and the number-of-teeth ratio where the number of teeth of the pinion is set at 20.

Furthermore, for reference, a black diamond in FIG. 15 represents an example where when the number Z2 of teeth of the pinion P is 12, the number-of-teeth ratio Z1/Z2 and d2/PCD are set at 48/12 and 20.00%, respectively, and a black triangle in FIG. 15 represents an example where when the number Z2 of teeth of the pinion P is 12, the number-of-teeth ratio Z1/Z2 and d2/PCD are set at 70/12 and 16.67%, respectively. A result of a simulation for strength analysis on these examples has confirmed that the gear strength equal to or greater than those of the conventional differential devices (more specifically, the gear strength equal to or greater than 87% of the gear strength of the reference differential device D') were obtained. Moreover, these examples fall within the specific area, as shown in FIG. 15.

As comparative examples, let us show examples which do not fall within the specific area. A white star in FIG. 13 represents an example where when the number Z2 of teeth of the pinion P is for example 10, the number-of-teeth ratio Z1/Z2 and d2/PCD are set at 58/10 and 27.50%, respectively, and a white circle in FIG. 13 represents an example where when the number Z2 of teeth of the pinion P is for example 10, the number-of-teeth ratio Z1/Z2 and d2/PCD are set at 40/10 and 34.29%, respectively. A white star in FIG. 15 represents an example where when the number Z2 of teeth of the pinion P is for example 12, the number-of-teeth ratio Z1/Z2 and d2/PCD are set at 70/12 and 27.50%, respectively, and a white circle in FIG. 15 represents an example where when the number Z2 of teeth of the pinion P is for example 12, the number-of-teeth ratio Z1/Z2 and d2/PCD are set at 48/12 and 34.29%, respectively. A result of a simulation for strength analysis on these examples has confirmed that the gear strength equal to or greater than those of the conventional differential devices (more specifically, the gear strength equal to or greater than 87% of the gear strength of the reference differential device D') were not obtained. In other words, the above effects cannot be obtained from the examples which do not fall within the specific area.

Although the embodiments of the present invention have been described, the present invention is not limited to the embodiments. Various design changes can be made to the present invention within the scope not departing from the gist of the present invention.

For example, in the embodiments, the pair of cover portions C, C' respectively covering the both outer sides of the differential mechanisms DM, DMX are formed separately from and welded to the input members I, IX. However, as adjoining means of the one cover portion C, various joining means other than welding, such as screwing means and crimping means, can also be carried out, and the other cover portion C may be formed integrally with the input members I, IX.

In addition, although each of the first and second embodiments has been shown in which the lightening portions 8 are formed in the side wall portion Cs of at least one of the cover portions C, C', no lightening portions 8 may be formed in the side wall portions Cs of both the left and right cover portions C, C' (i.e., the side wall portions Cs may be formed in a disk shape) and such side wall portions Cs respectively may cover the entire back surfaces of the side gears S. Incidentally, in this case, the side wall portions Cs of the cover portions C, C' having no lightening portions 8 and formed in a disk shape may be respectively joined to entire peripheries of the welded portions 21 of the attachment holes Ih of the input member I by butt welding w, or to only parts of the peripheries thereof by butt welding w.

Furthermore, the embodiments have been shown in which the input members I, IX integrally are provided together with the input tooth portion Ig or the driven pulley Ip as the input parts. However, in the present invention, a ring gear or a driven pulley as the input parts may be formed separately from the input members I, IX, respectively, and then the ring gear or the driven pulley may be fixed later to the outer peripheral portions of the input members I, IX.

Moreover, the input members of the present invention may have a structure which provides neither the input tooth portion Ig nor the driven pulley Ip unlike the structures of the embodiments. For example, the input members I, IX may be operatively connected to a drive member (for example, an output member of a planetary gear mechanism or a reduction gear mechanism, a driven wheel of an endless transmission belt-type transmission mechanism, or the like) situated more upstream than the input members I, IX on the power transmission passage so that the rotational driving force is inputted into the input members I, IX. In this case, portions of the input members I, IX which are operatively connected to the drive member are the input parts of the input members.

Besides, although each of the first and second embodiments has been shown in which the back surfaces of the pair of side gears S are covered with the pair of cover portions C, C', the present invention may be carried out as such that the back surface of only one side gear S is provided with the cover portion. In this case, for example, the drive member situated on the upstream side may be disposed on a side of the side gear provided with no cover portion so that the drive member and the input member are operatively connected to each other on the side of the side gear provided with no cover portion.

In addition, although the each of the foregoing embodiments has been shown in which the differential device D allows the difference in rotation between the left and right axles, the differential device of the present invention may be carried out as a center differential configured to absorb the difference in rotation between front wheels and rear wheels.

What is claimed is:

1. A differential device comprising:
   a differential case; and
   a differential mechanism housed in the differential case and distributively transmitting rotational force of the differential case to a pair of mutually-independent output shafts,
   wherein the differential case includes
      an input member including an input part which receives the rotational force, an end portion of the input member on at least one side in an axial direction thereof being opened, and
      at least one cover portion covering the opened end portion of the input member on the one side in the axial direction,
   the input member includes
      a welded portion to which the cover portion is fitted in the axial direction of the input member and joined by welding,
      a press-fitted portion located inward of the welded portion in a radial direction and the axial direction of the input member, the cover portion being press-fitted to the press-fitted portion, and
      a connecting surface connecting the welded portion and the press-fitted portion and forming a space between the connecting surface and the cover portion, the space allowing deformation of the press-fitted portion during the press-fitting, and
   the connecting surface includes one end portion continuous to the welded portion, the one end portion extending outward from the welded portion in the radial direction.

2. The differential device according to claim 1, wherein part of the press-fitted portion and the space are disposed overlapping each other as seen in the radial direction from a center of rotation of the input member.

3. The differential device according to claim 2, wherein the cover portion includes
   a boss portion concentrically surrounding the output shafts, and
   a side wall portion connected to the boss portion so as to extend outward in the radial direction from the boss portion,
a large-diameter portion and a small-diameter portion are formed in an outer peripheral portion of the side wall portion, the large-diameter portion being fitted to and joined by welding to the welded portion, and the small-diameter portion being continuous to an axial inner end of the large-diameter portion via a step surface and press-fitted into the press-fitted portion,
an axial outer end of the press-fitted portion is abutted against or comes close to the step surface, and
the connecting surface includes an inclined portion which gradually separates from the step surface as the connecting surface goes outward in the radial direction from the axial outer end or a vicinity of the axial outer end.

4. The differential device according to claim 1, wherein the cover portion includes
   a boss portion concentrically surrounding the output shafts, and
   a side wall portion connected to the boss portion so as to extend outward in the radial direction from the boss portion,
a large-diameter portion and a small-diameter portion are formed in an outer peripheral portion of the side wall portion, the large-diameter portion being fitted to and joined by welding to the welded portion, and the small-diameter portion being continuous to an axial inner end of the large-diameter portion via a step surface and press-fitted into the press-fitted portion,
an axial outer end of the press-fitted portion is abutted against or comes close to the step surface, and
the connecting surface includes an inclined portion which gradually separates from the step surface as the connecting surface goes outward in the radial direction from the axial outer end or a vicinity of the axial outer end.

5. A differential device which distributively transmits rotational force of an input member to a pair of mutually-independent output shafts, the input member retaining a pinion support portion that supports a pinion and being rotatable together with the pinion support portion, the differential device comprising:

a pair of side gears each having a tooth portion placed at an outer peripheral portion thereof in mesh with the pinion and connected to the pair of output shafts, respectively; and at least one cover portion attached to the input member and covering an outside of at least one side gear, wherein the input member includes a welded portion to which the cover portion is fitted in an axial direction of the input member and joined by welding, a press-fitted portion located inward of the welded portion in a radial direction and the axial direction of the input member, the cover portion being press-fitted to the press-fitted portion, and a connecting surface connecting the welded portion and the press-fitted portion and forming a space between the connecting surface and the cover portion, the space allowing deformation of the press-fitted portion during the press-fitting, and the connecting surface includes one end portion continuous to the welded portion, the one end portion extending outward from the welded portion in the radial direction.

6. The differential device according to claim 5, wherein part of the press-fitted portion and the space are disposed overlapping each other as seen in the radial direction from a center of rotation of the input member.

7. The differential device according to claim 6, wherein the cover portion includes a boss portion concentrically surrounding the output shafts, and a side wall portion connected to the boss portion so as to extend outward in the radial direction from the boss portion, a large-diameter portion and a small-diameter portion are formed in an outer peripheral portion of the side wall portion, the large-diameter portion being fitted to and joined by welding to the welded portion, and the small-diameter portion being continuous to an axial inner end of the large-diameter portion via a step surface and press-fitted into the press-fitted portion, an axial outer end of the press-fitted portion is abutted against or comes close to the step surface, and the connecting surface includes an inclined portion which gradually separates from the step surface as the connecting surface goes outward in the radial direction from the axial outer end or a vicinity of the axial outer end.

8. The differential device according to claim 5, wherein the cover portion includes a boss portion concentrically surrounding the output shafts, and a side wall portion connected to the boss portion so as to extend outward in the radial direction from the boss portion, a large-diameter portion and a small-diameter portion are formed in an outer peripheral portion of the side wall portion, the large-diameter portion being fitted to and joined by welding to the welded portion, and the small-diameter portion being continuous to an axial inner end of the large-diameter portion via a step surface and press-fitted into the press-fitted portion, an axial outer end of the press-fitted portion is abutted against or comes close to the step surface, and the connecting surface includes an inclined portion which gradually separates from the step surface as the connecting surface goes outward in the radial direction from the axial outer end or a vicinity of the axial outer end.

9. A differential device which distributively transmits rotational force of an input member to a pair of mutually-independent output shafts, the input member supporting a differential gear support portion that supports a differential gear and being rotatable together with the differential gear support portion, the differential device comprising:

a pair of output gears each including a tooth portion placed at an outer peripheral portion thereof in mesh with the differential gear and connected to the pair of output shafts, respectively, and at least one cover portion attached to the input member and covering an outside of at least one output gear, wherein the input member includes a welded portion to which the cover portion is fitted in an axial direction of the input member and joined by welding, a press-fitted portion located inward of the welded portion in a radial direction and the axial direction of the input member, the cover portion being press-fitted to the press-fitted portion, and a connecting surface connecting the welded portion and the press-fitted portion and forming a space between the connecting surface and the cover portion, the space allowing deformation of the press-fitted portion during the press-fitting, and the connecting surface includes one end portion continuous to the welded portion, the one end portion extending outward from the welded portion in the radial direction, wherein $$d2/PCD \le 3.36 \cdot \left(\frac{1}{z1}\right)^{\frac{2}{3}} \cdot \sin\left(\tan^{-1}\frac{z1}{z2}\right)$$

is satisfied, and

Z1/Z2>2 is satisfied, where Z1, Z2, d2 and PCD denote the number of teeth of each of the output gears, the number of teeth of the differential gear, a diameter of the differential gear support portion and a pitch cone distance, respectively.

10. The differential device according to claim 9, wherein part of the press-fitted portion and the space are disposed overlapping each other as seen in the radial direction from a center of rotation of the input member.

11. The differential device according to claim 10, wherein the cover portion includes a boss portion concentrically surrounding the output shafts, and a side wall portion connected to the boss portion so as to extend outward in the radial direction from the boss portion, a large-diameter portion and a small-diameter portion are formed in an outer peripheral portion of the side wall portion, the large-diameter portion being fitted to and joined by welding to the welded portion, and the small-diameter portion being continuous to an axial inner end of the large-diameter portion via a step surface and press-fitted into the press-fitted portion, an axial outer end of the press-fitted portion is abutted against or comes close to the step surface, and the connecting surface includes an inclined portion which gradually separates from the step surface as the connecting surface goes outward in the radial direction from the axial outer end or a vicinity of the axial outer end.

12. The differential device according to claim 11, wherein $Z1/Z2 \geq 4$ is satisfied.

13. The differential device according to claim 11, wherein $Z1/Z2 \geq 5.8$ is satisfied.

14. The differential device according to claim 10, wherein $Z1/Z2 \geq 4$ is satisfied.

15. The differential device according to claim 10, wherein $Z1/Z2 \geq 5.8$ is satisfied.

16. The differential device according to claim 9, wherein the cover portion includes
    a boss portion concentrically surrounding the output shafts, and
    a side wall portion connected to the boss portion so as to extend outward in the radial direction from the boss portion,
a large-diameter portion and a small-diameter portion are formed in an outer peripheral portion of the side wall portion, the large-diameter portion being fitted to and joined by welding to the welded portion, and the small-diameter portion being continuous to an axial inner end of the large-diameter portion via a step surface and press-fitted into the press-fitted portion,
an axial outer end of the press-fitted portion is abutted against or comes close to the step surface, and
the connecting surface includes an inclined portion which gradually separates from the step surface as the connecting surface goes outward in the radial direction from the axial outer end or a vicinity of the axial outer end.

17. The differential device according to claim 16, wherein $Z1/Z2 \geq 4$ is satisfied.

18. The differential device according to claim 16, wherein $Z1/Z2 \geq 5.8$ is satisfied.

19. The differential device according to claim 9, wherein $Z1/Z2 \geq 4$ is satisfied.

20. The differential device according to claim 9, wherein $Z1/Z2 \geq 5.8$ is satisfied.

* * * * *